United States Patent
Park et al.

(10) Patent No.: US 11,870,524 B2
(45) Date of Patent: Jan. 9, 2024

(54) METHOD FOR REPORTING CHANNEL STATE INFORMATION IN ORDER FOR PERFORMING ANTENNA ARRAY-BASED BEAMFORMING IN WIRELESS COMMUNICATION SYSTEM, AND DEVICE THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Wonjae Ryoo, Seoul (KR); Wonjin Sung, Seoul (KR); Hyukjun Lee, Seoul (KR); Haewook Park, Seoul (KR)

(73) Assignees: LG ELECTRONICS INC., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 383 days.

(21) Appl. No.: 17/274,156

(22) PCT Filed: Sep. 5, 2019

(86) PCT No.: PCT/KR2019/011515
§ 371 (c)(1),
(2) Date: Mar. 5, 2021

(87) PCT Pub. No.: WO2020/050666
PCT Pub. Date: Mar. 12, 2020

(65) Prior Publication Data
US 2021/0242919 A1 Aug. 5, 2021

(30) Foreign Application Priority Data
Sep. 5, 2018 (KR) .................. 10-2018-0105668

(51) Int. Cl.
H04B 7/06 (2006.01)
H04B 7/0456 (2017.01)
H04B 7/0491 (2017.01)

(52) U.S. Cl.
CPC .......... *H04B 7/0626* (2013.01); *H04B 7/0456* (2013.01); *H04B 7/0491* (2013.01); *H04B 7/0617* (2013.01)

(58) Field of Classification Search
CPC .. H04B 7/0626; H04B 7/0456; H04B 7/0491; H04B 7/0617; H04B 7/063
(Continued)

(56) References Cited

U.S. PATENT DOCUMENTS

2013/0301454 A1* 11/2013 Seol ............... H04B 7/0695
370/252
2019/0165890 A1* 5/2019 Pietraski ............ H04L 5/0044
(Continued)

FOREIGN PATENT DOCUMENTS

| KR | 101252859 | 4/2013 |
| KR | 1020170121882 | 11/2017 |

(Continued)

OTHER PUBLICATIONS

PCT International Application No. PCT/KR2019/011515, International Searching Authority dated Feb. 8, 2020, 3 pages.

*Primary Examiner* — Candal Elpenord
(74) *Attorney, Agent, or Firm* — LEE, HONG, DEGERMAN, KANG & WAIMEY PC

(57) ABSTRACT

A method for reporting channel state information (CSI) by user equipment (UE) for beamforming based on an antenna array in a wireless communication system according to an embodiment of the present disclosure includes: receiving a channel state information reference signal (CSI-RS); generating channel state information using the CSI-RS and
(Continued)

codebook generated in advance; and reporting the channel state information. The channel state information includes information related to a codevector determined in the codebook, the antenna array has a three-dimensional shape having omnidirectional symmetry, the codebook is generated based on a position of the UE having a center of the three-dimensional shape as an origin, and the position of the UE is represented based on a polar coordinate system.

15 Claims, 45 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2019/0229952 A1* | 7/2019 | Sun | H04L 25/0224 |
| 2019/0306675 A1* | 10/2019 | Xue | H04B 17/345 |
| 2019/0349042 A1* | 11/2019 | Ramireddy | H04B 7/0479 |
| 2019/0349045 A1* | 11/2019 | Varatharaajan | H04B 7/0469 |
| 2021/0143870 A1* | 5/2021 | Faxér | H04B 7/0626 |
| 2021/0143885 A1* | 5/2021 | Großmann | H04B 7/0632 |
| 2023/0037317 A1* | 2/2023 | Kwak | H04W 52/0245 |

FOREIGN PATENT DOCUMENTS

| | | |
|---|---|---|
| WO | 101300837 | 8/2013 |
| WO | 2017014609 | 1/2017 |
| WO | 2017034341 | 3/2017 |

\* cited by examiner

[FIG. 1]
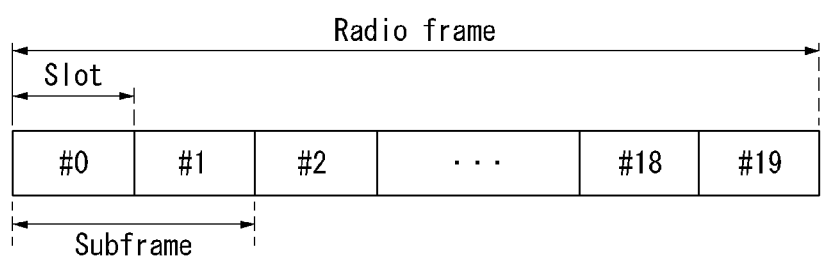

[FIG. 2]
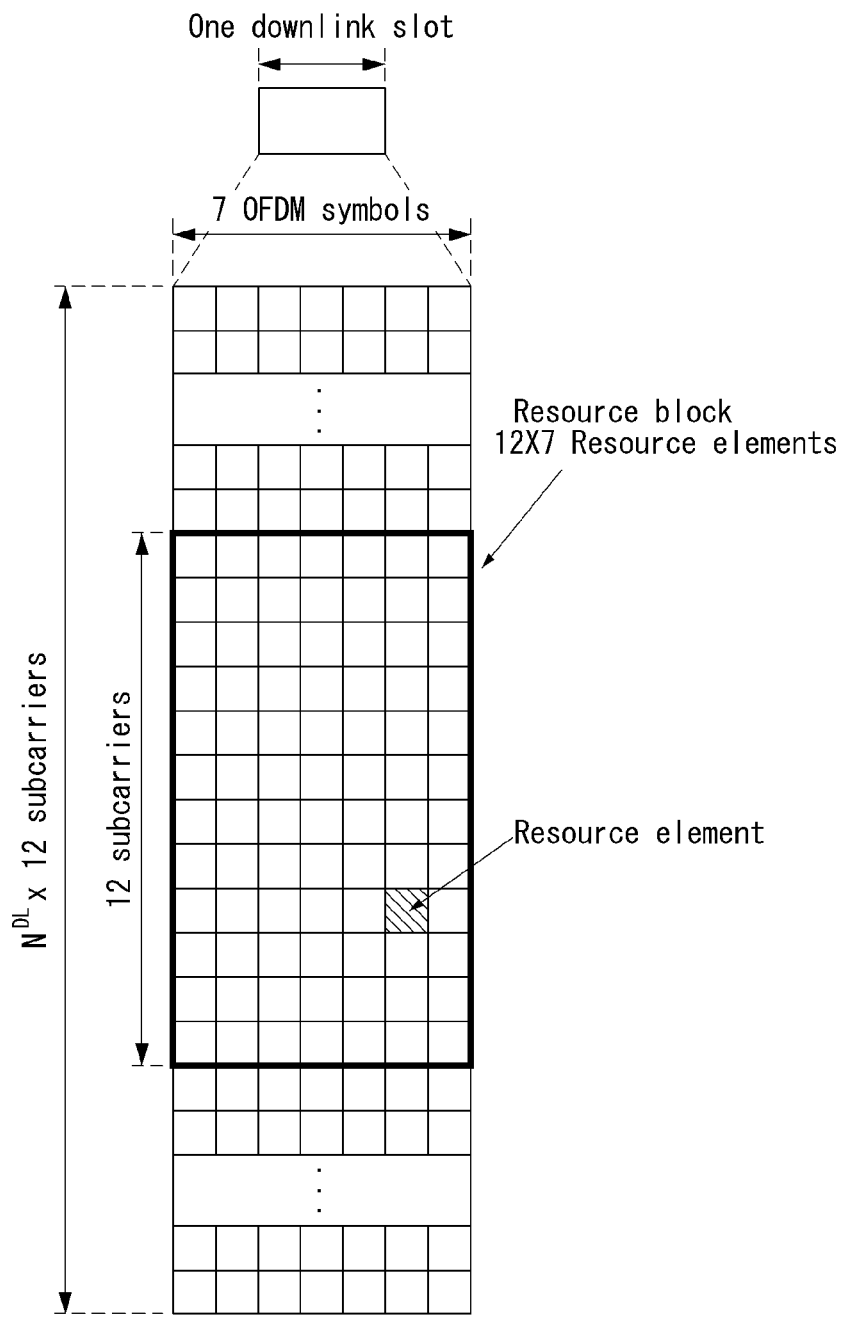

[FIG. 3]
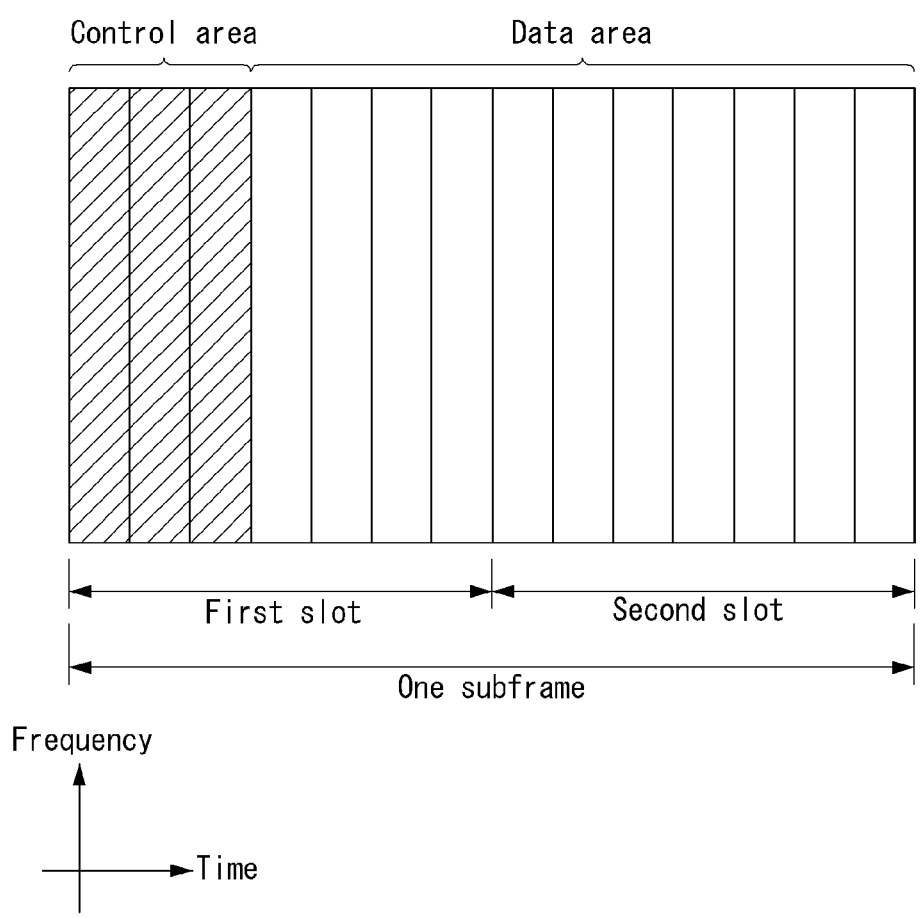

[FIG. 4]
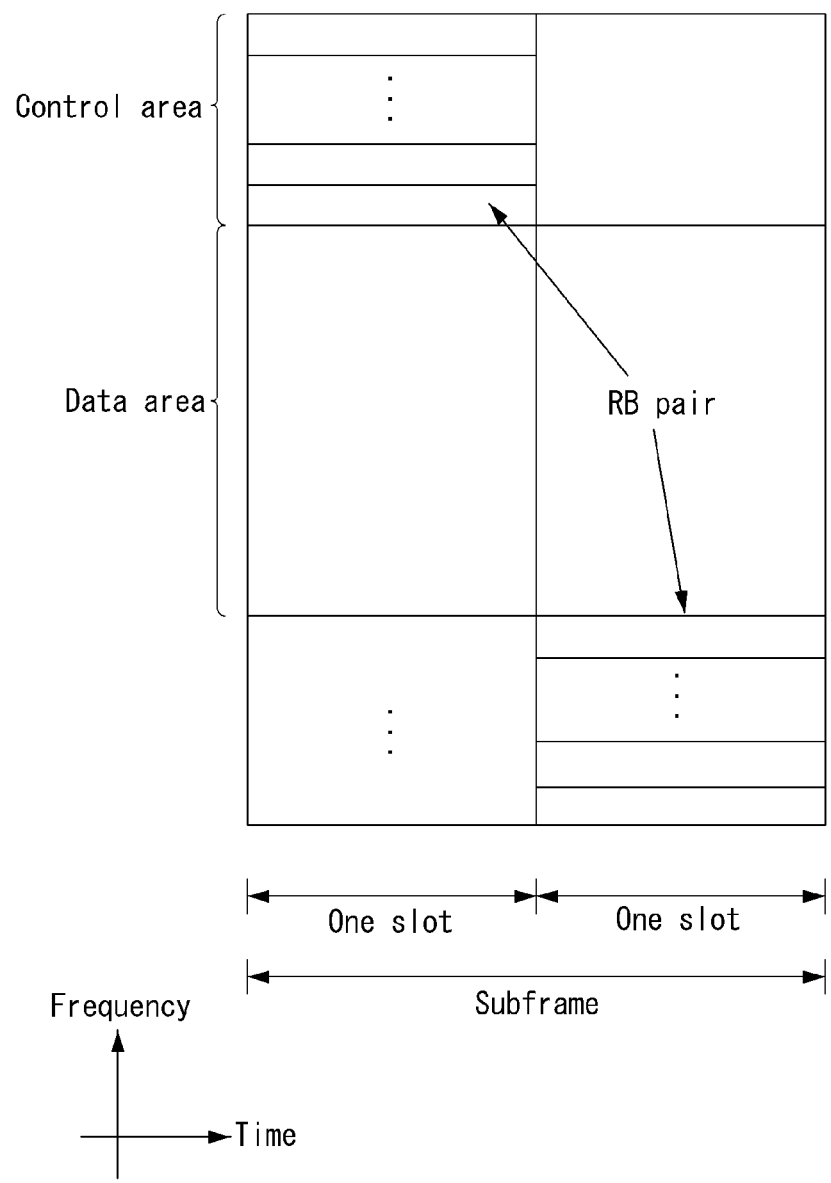

[FIG. 5]
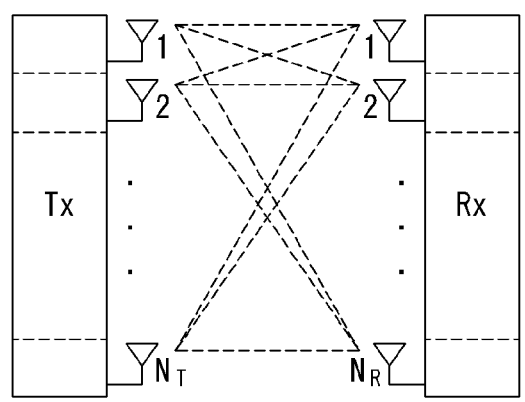

[FIG. 6]
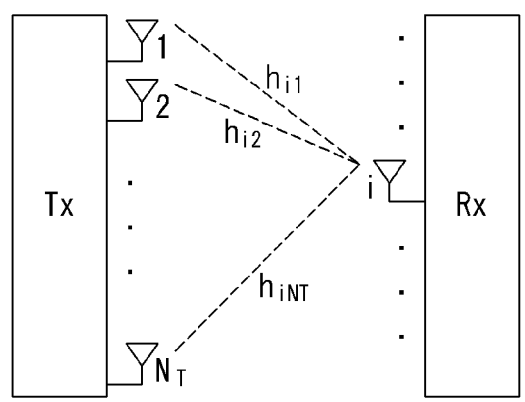

[FIG. 7]
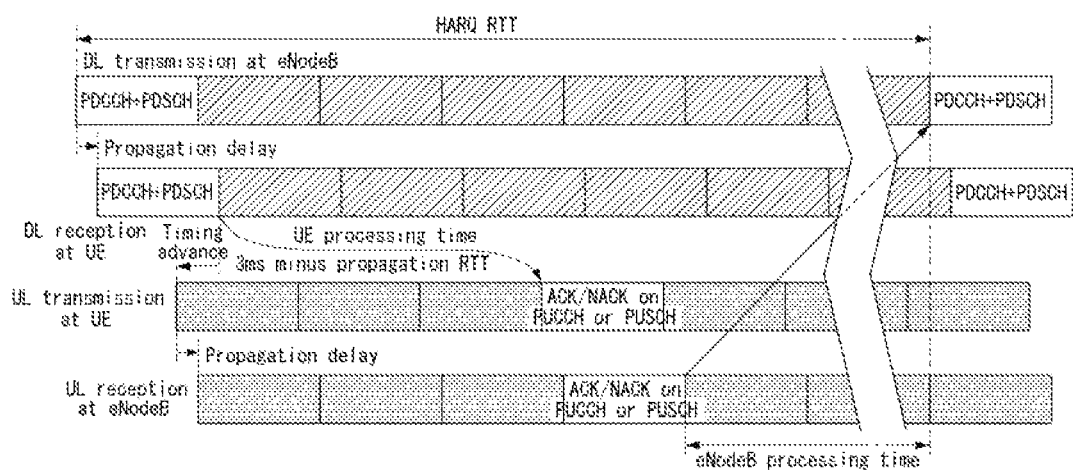

[FIG. 8]
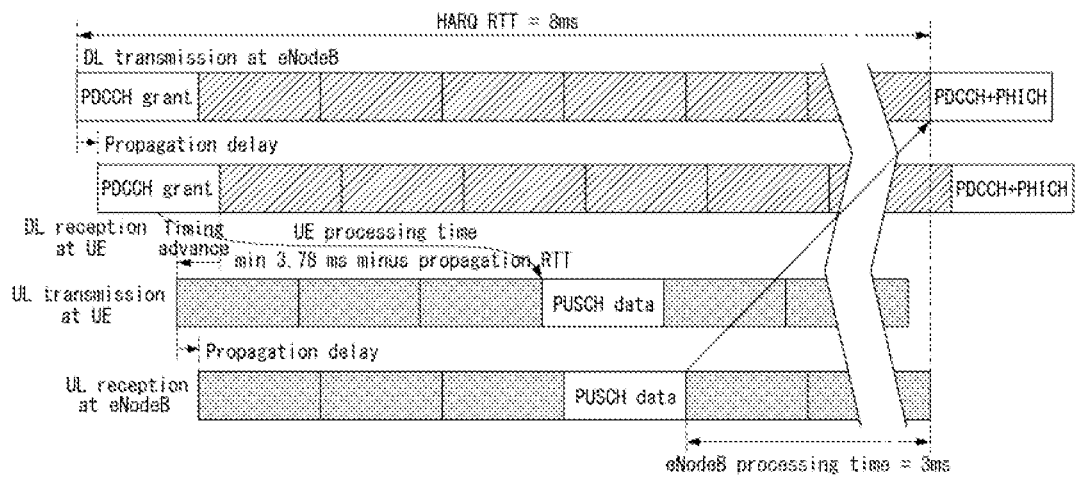

[FIG. 9]
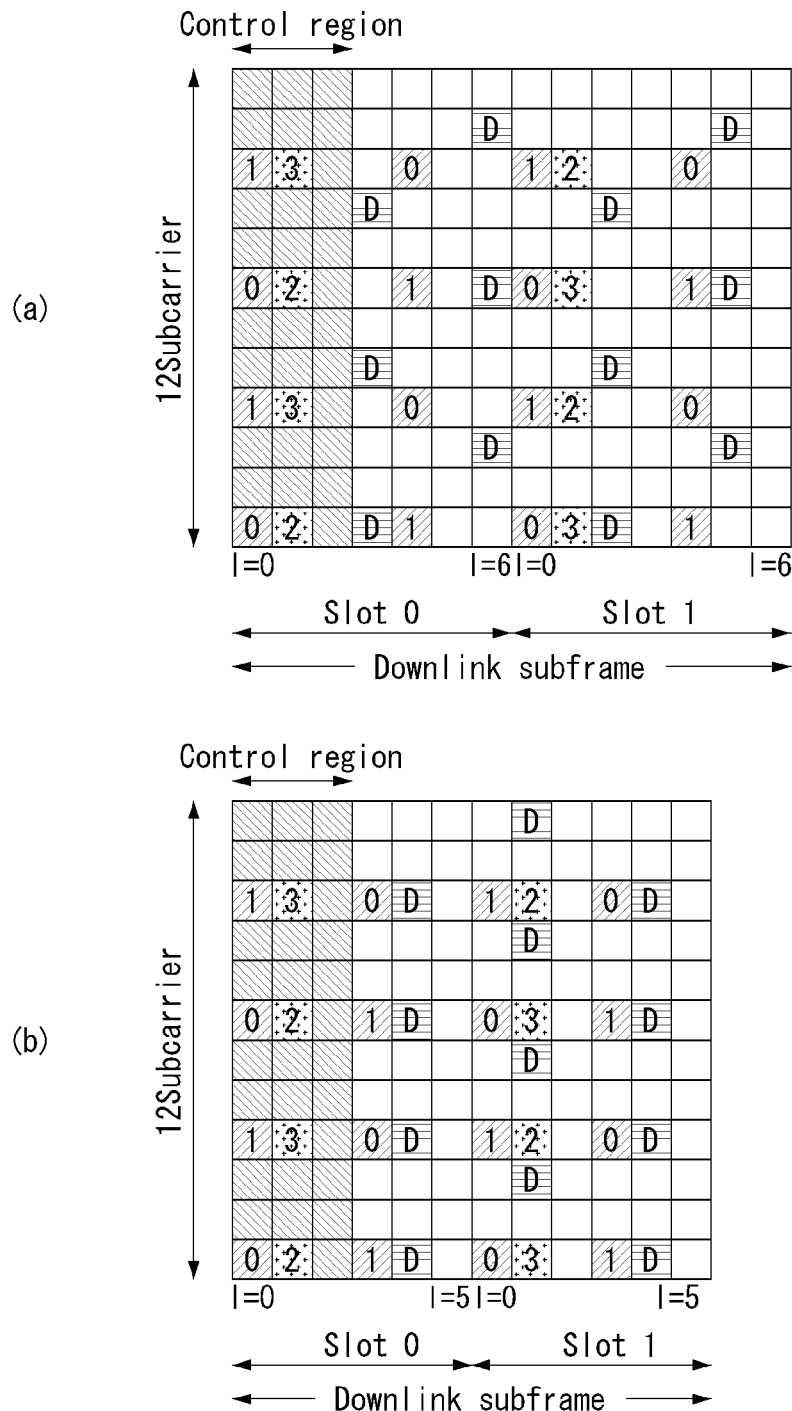

[FIG. 10]
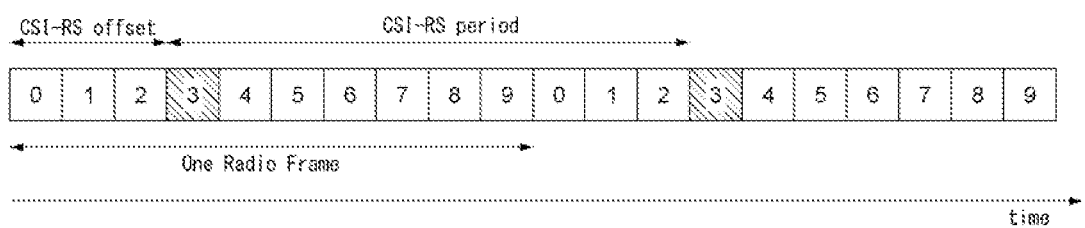

[FIG. 11]
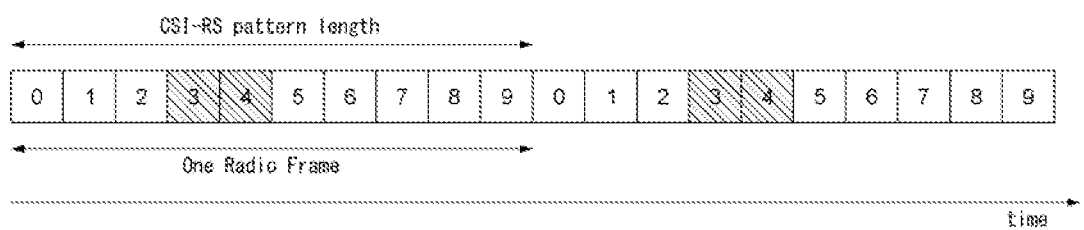

[FIG. 12]
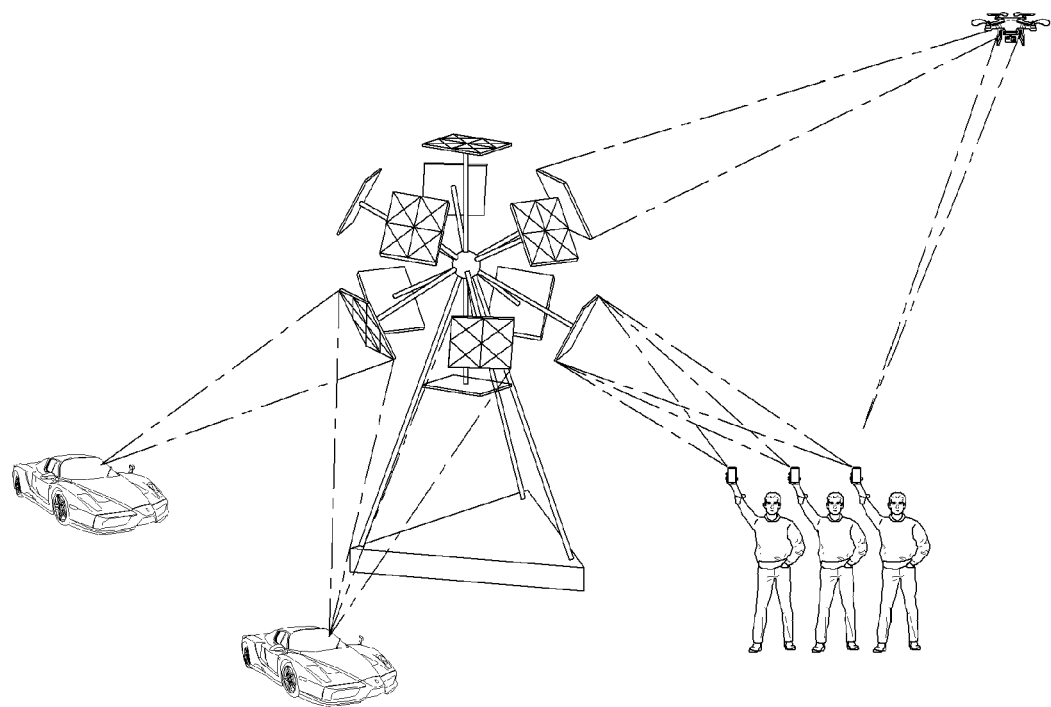

【FIG. 13】
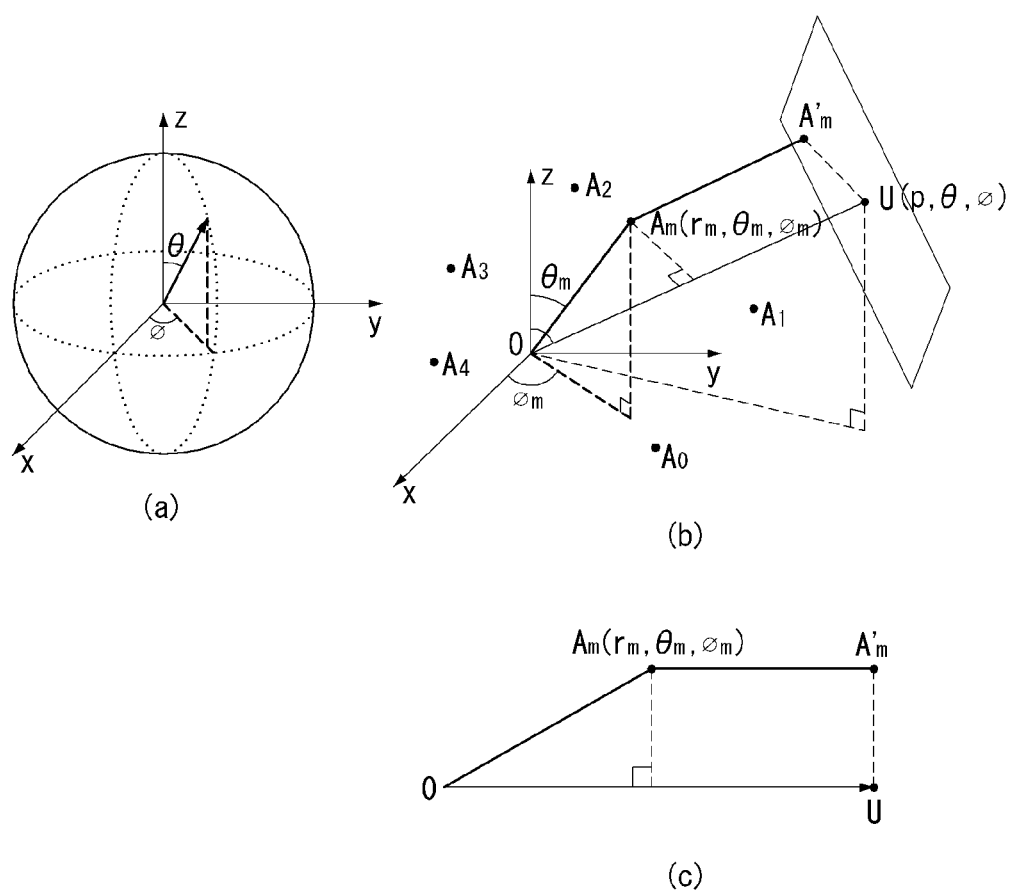

[FIG. 14]
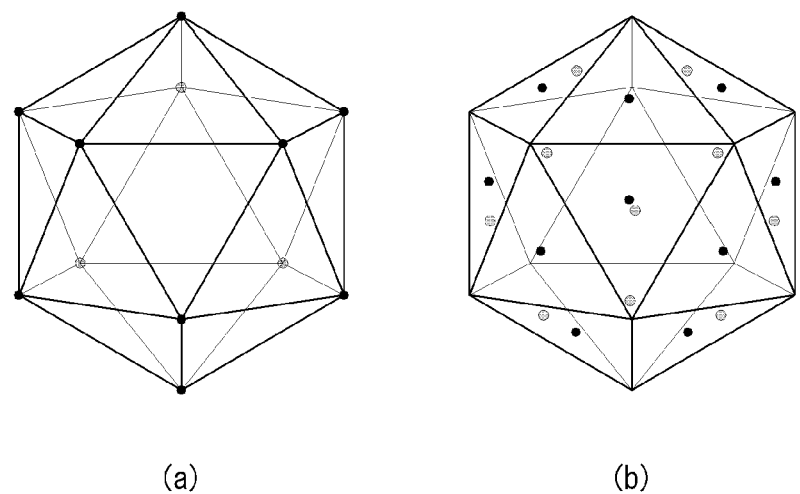
(a)                  (b)

[FIG. 15]
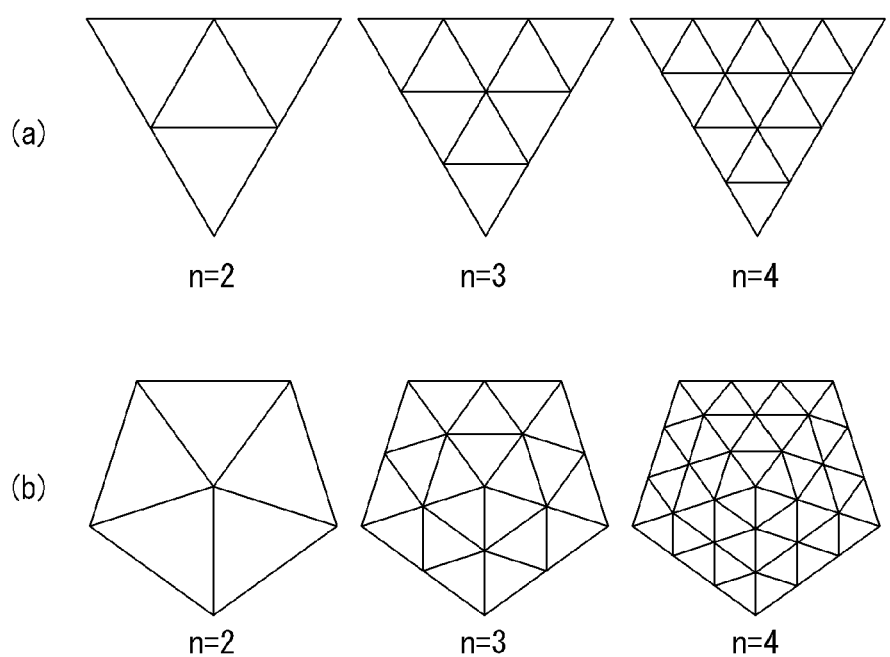

[FIG. 16]
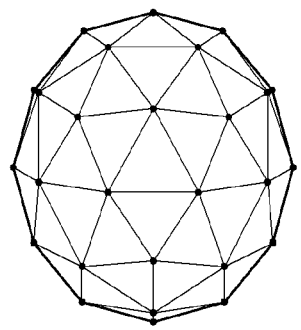
(a)
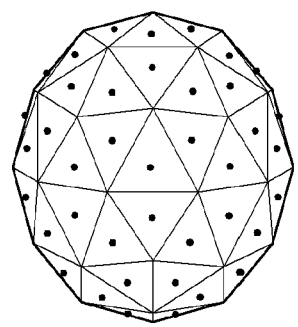
(b)
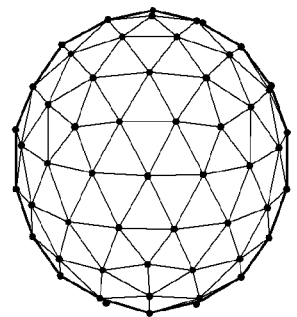
(c)
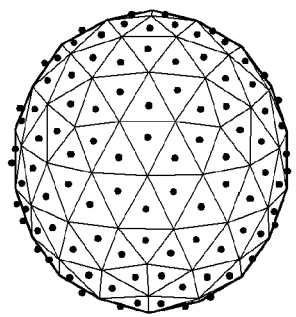
(d)
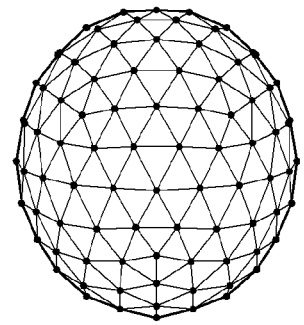
(e)
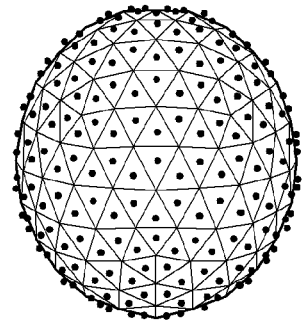
(f)

[FIG. 17]
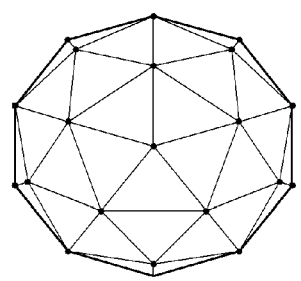
(a)
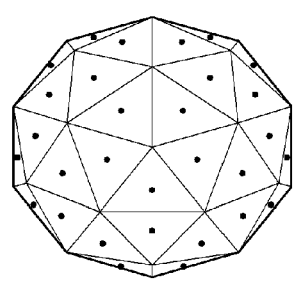
(b)
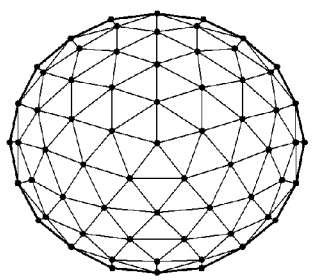
(c)
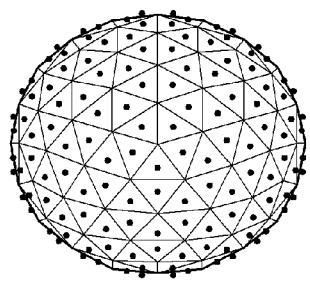
(d)
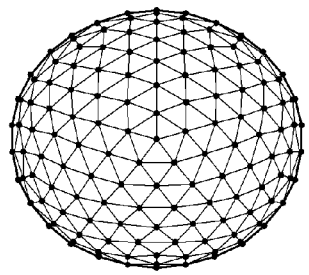
(e)
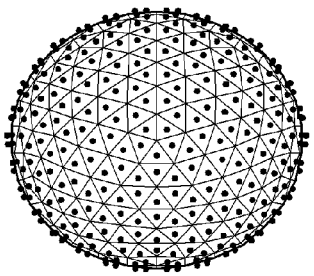
(f)

[FIG. 18]
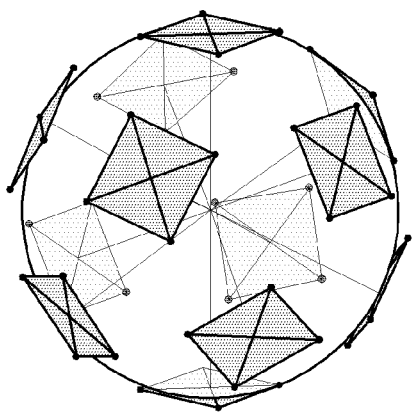
(a)
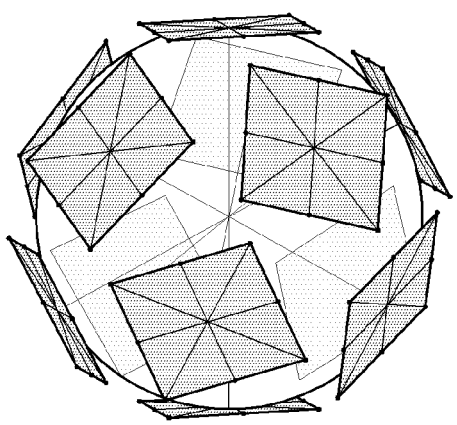
(b)

[FIG. 19]
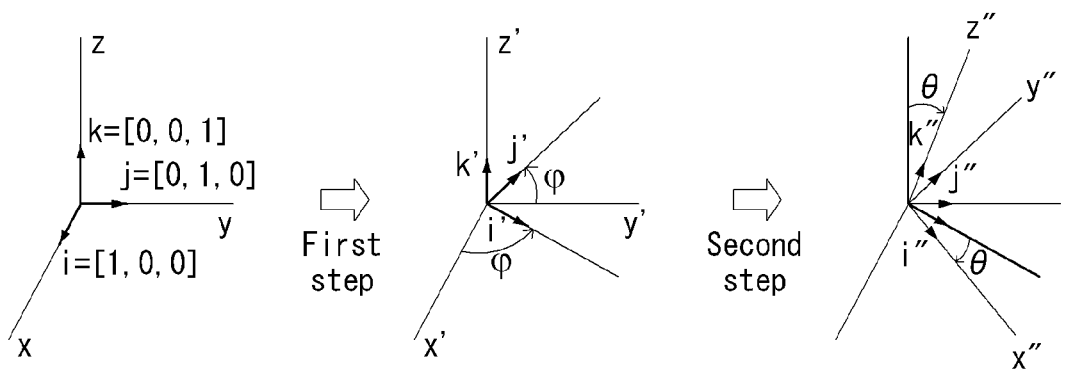

[FIG. 20]
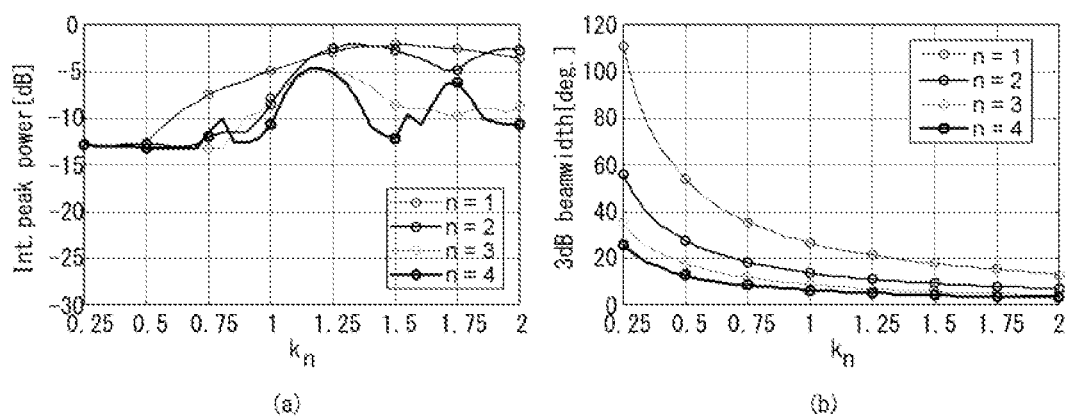

[FIG. 21]
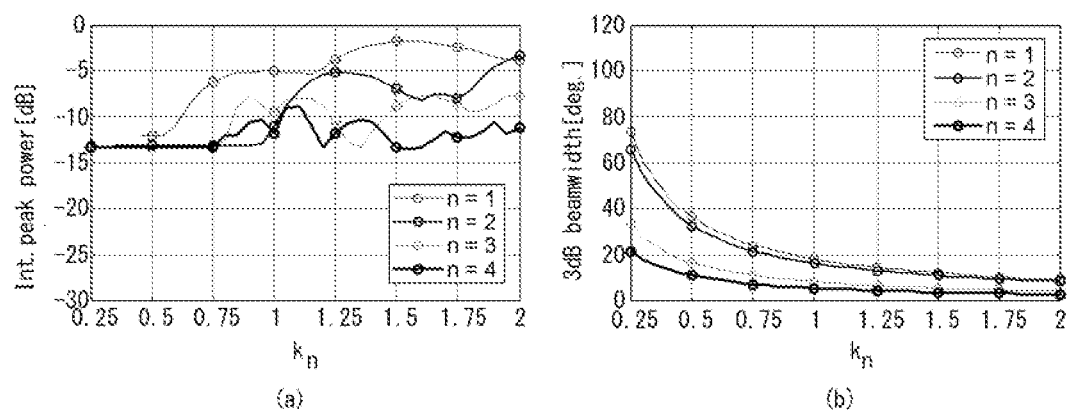

[FIG. 22]
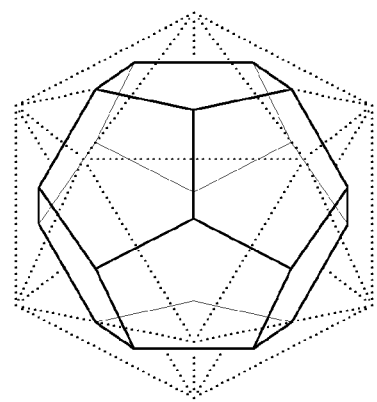
(a)
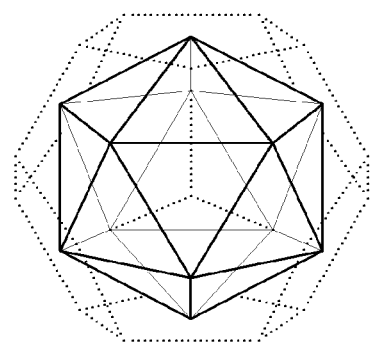
(b)

[FIG. 23]
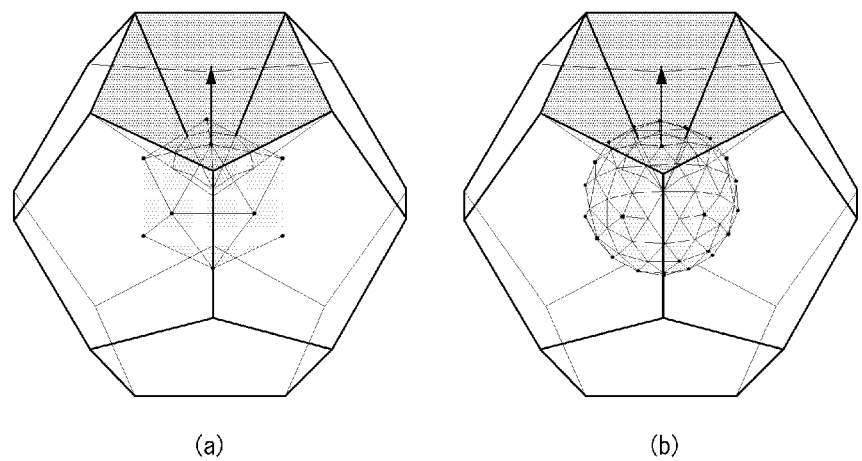
(a)          (b)

[FIG. 24]
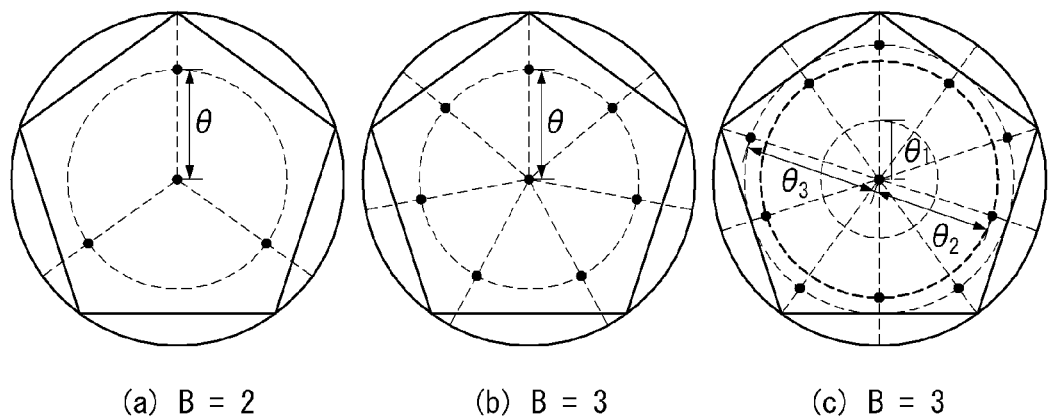
(a) B = 2    (b) B = 3    (c) B = 3

[FIG. 25]
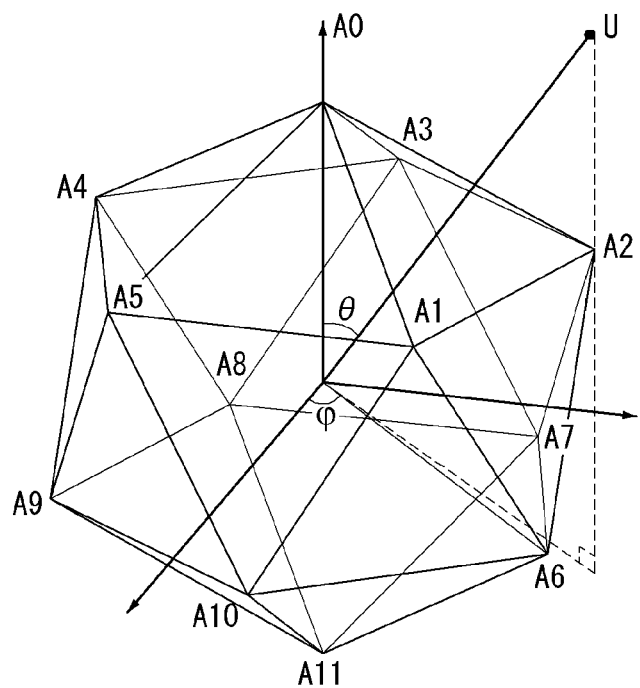

[FIG. 26]
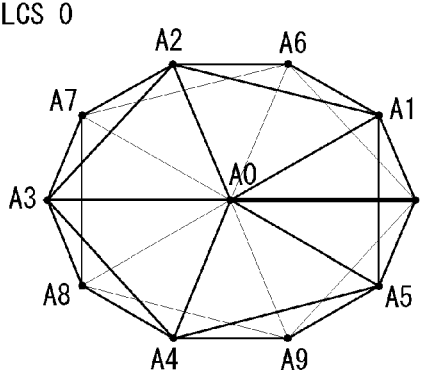
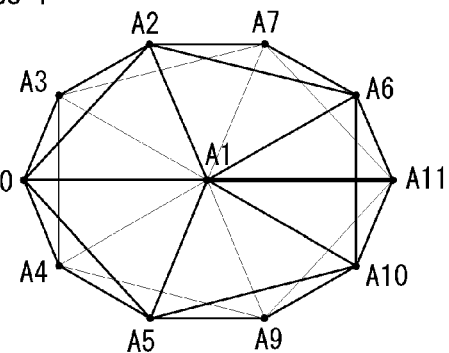
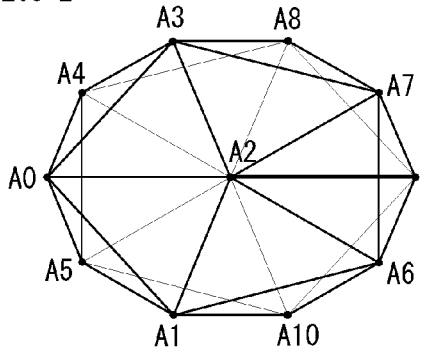
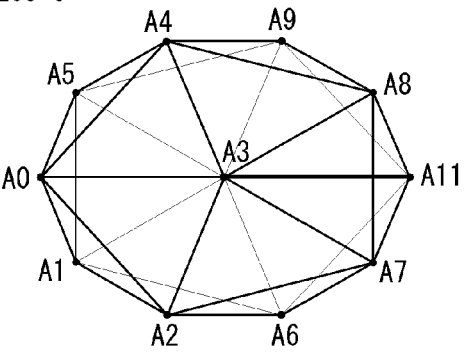
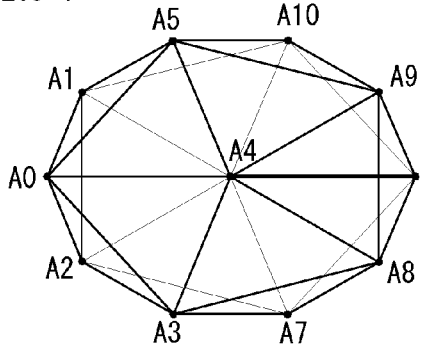
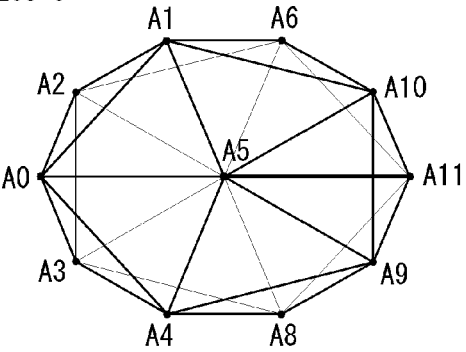

[FIG. 27]
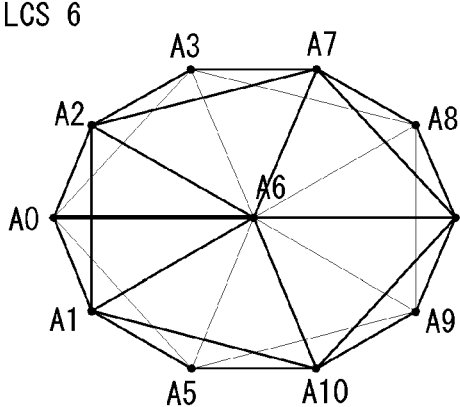
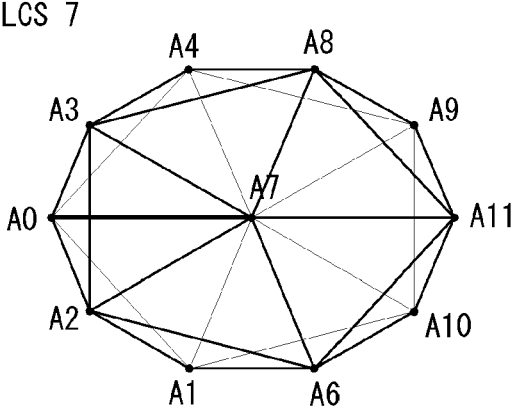
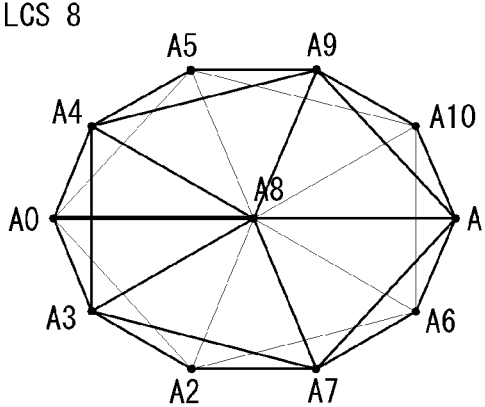
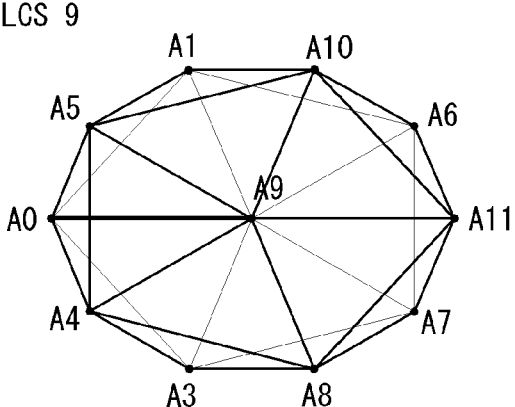
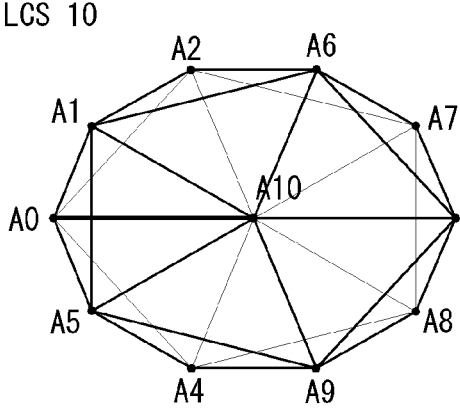
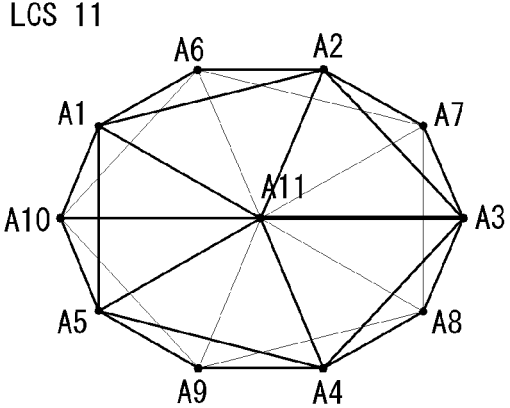

[FIG. 28]
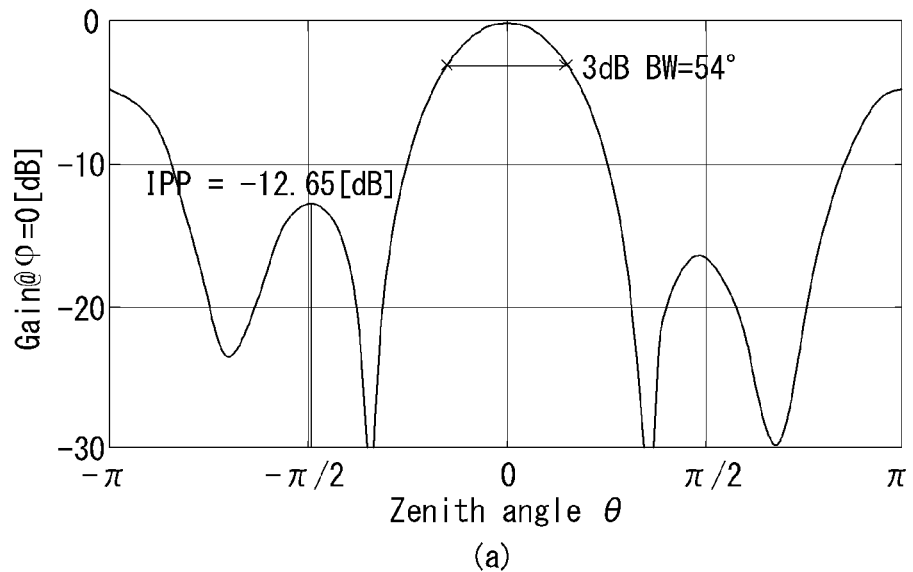
(a)
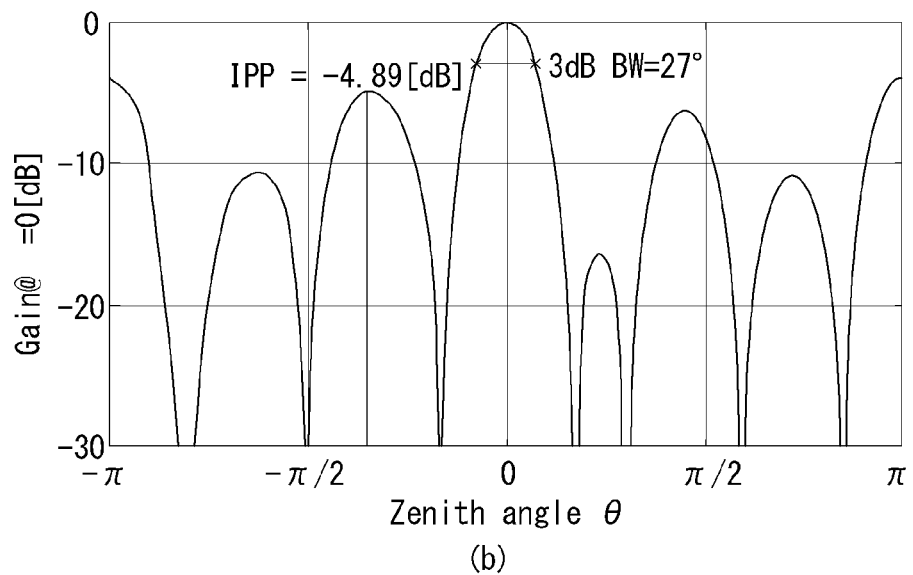
(b)

[FIG. 29]
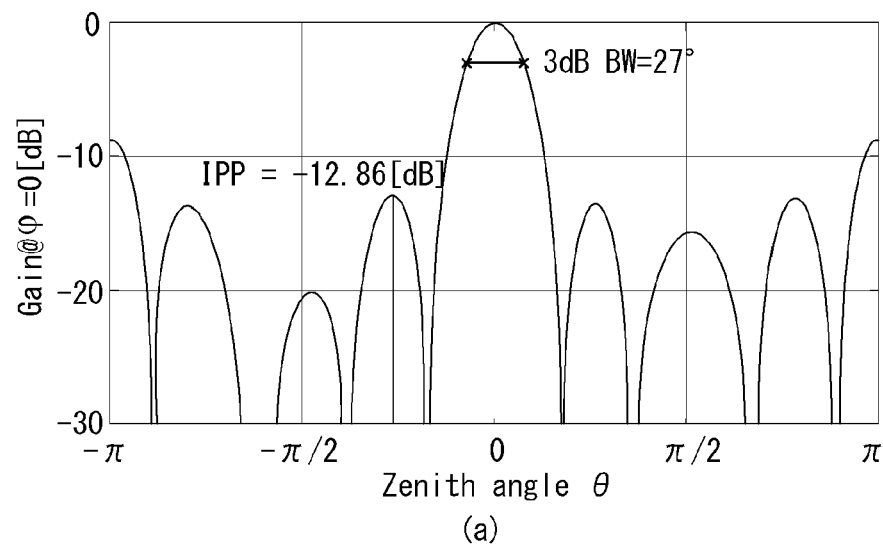
(a)
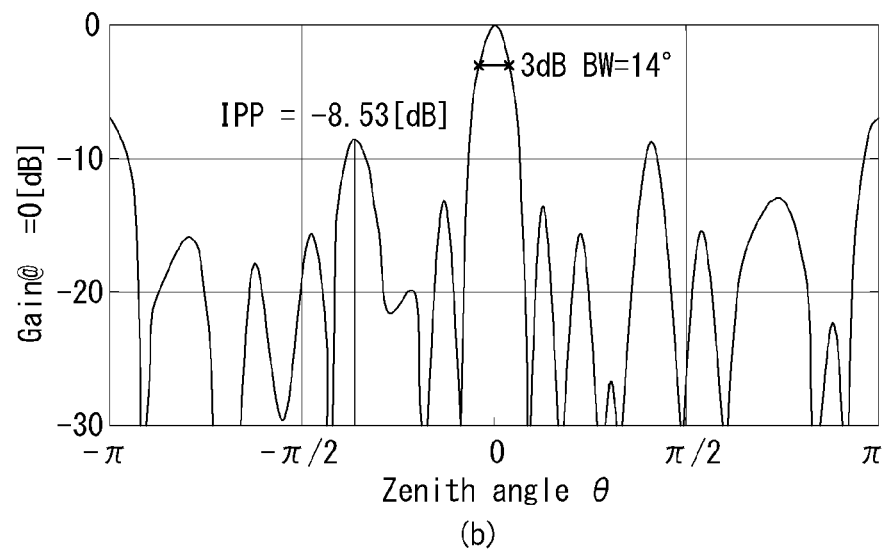
(b)

[FIG. 30]
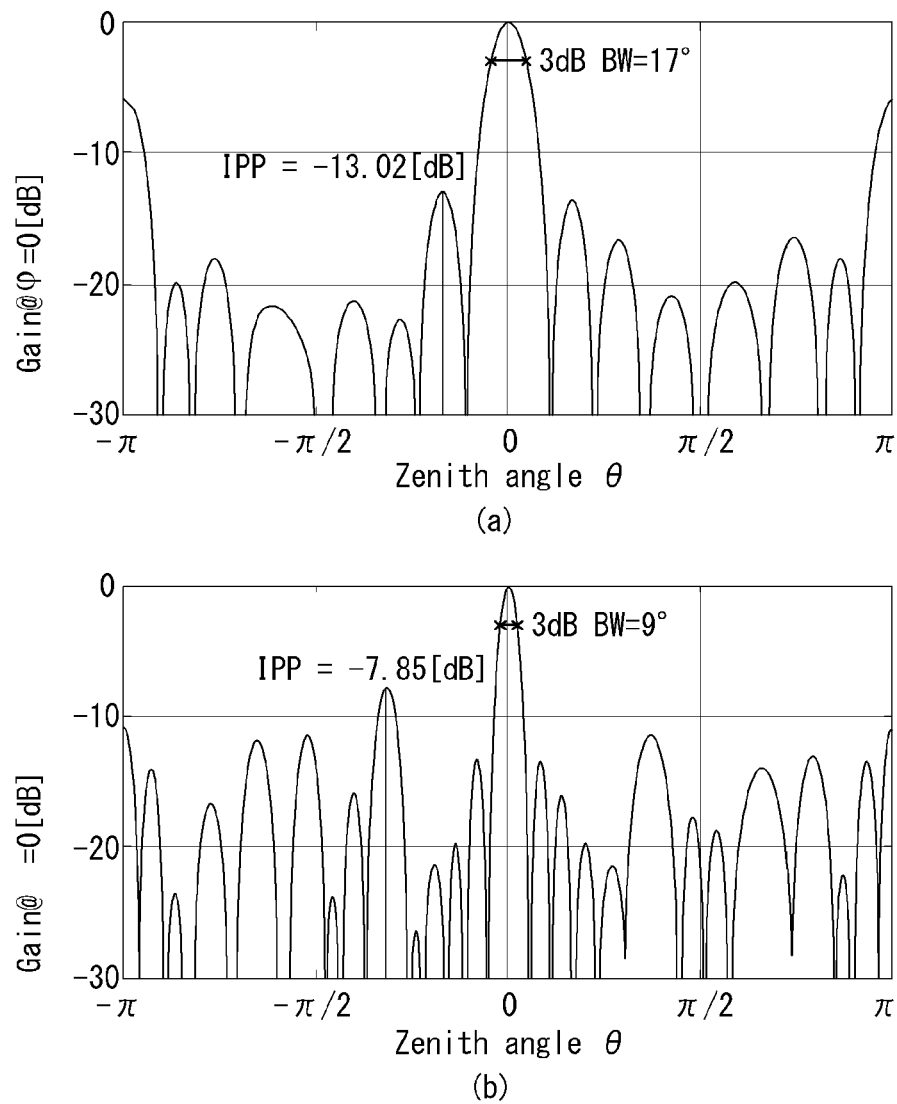

[FIG. 31]
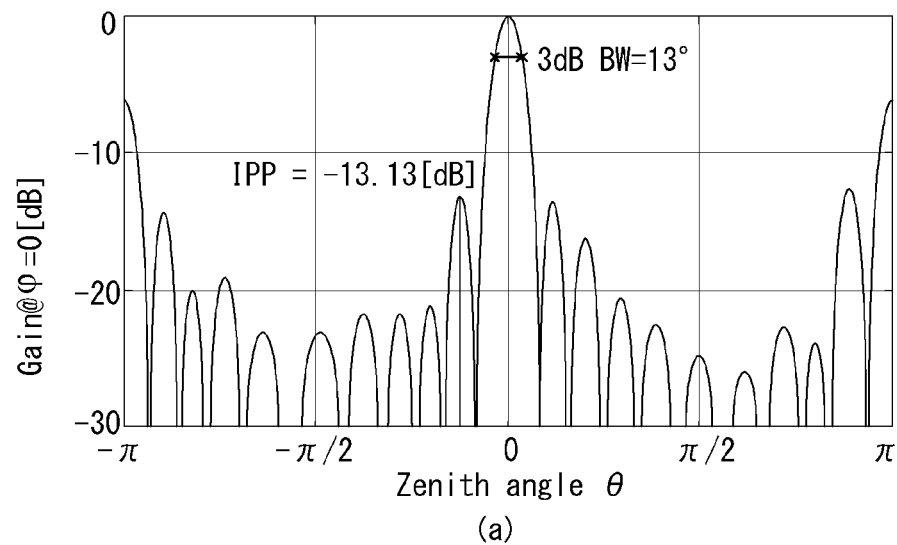
(a)
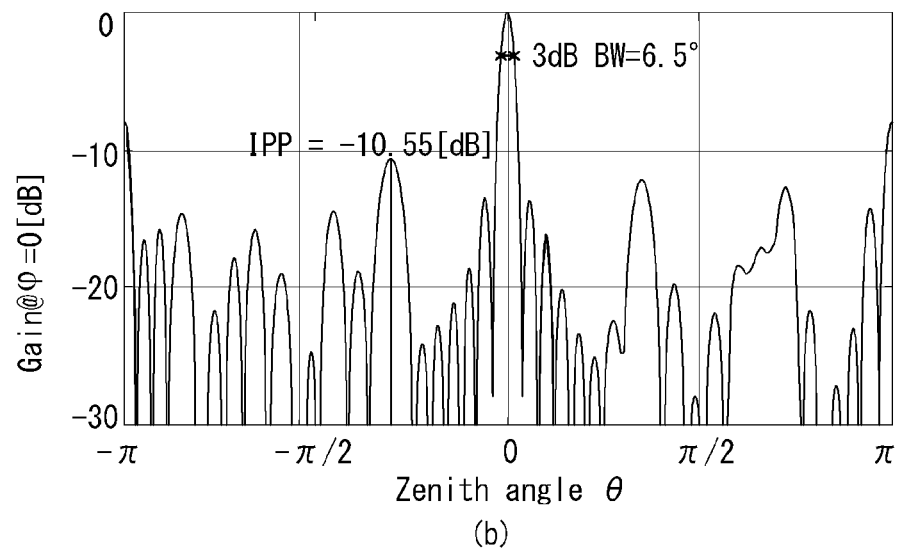
(b)

[FIG. 32]
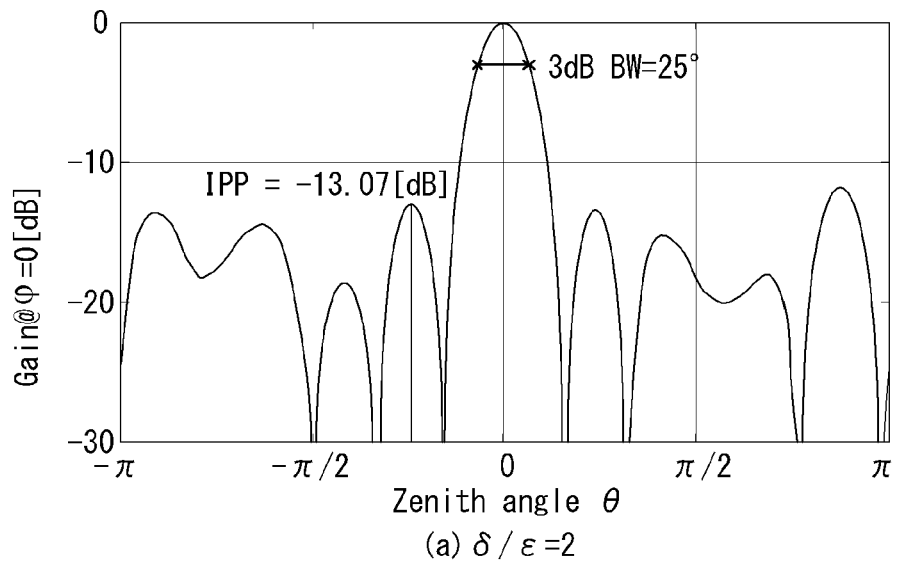
(a) $\delta/\varepsilon=2$
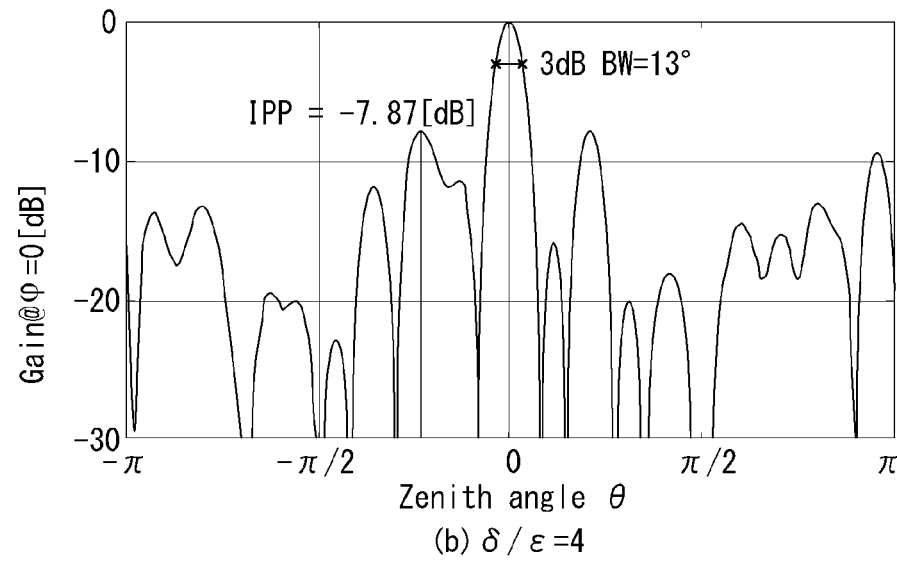
(b) $\delta/\varepsilon=4$ 【FIG. 33】
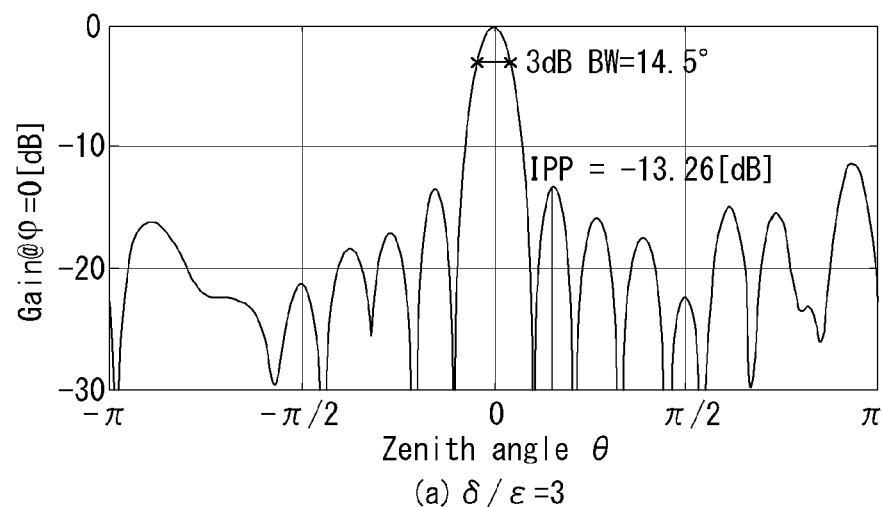
(a) $\delta/\varepsilon=3$
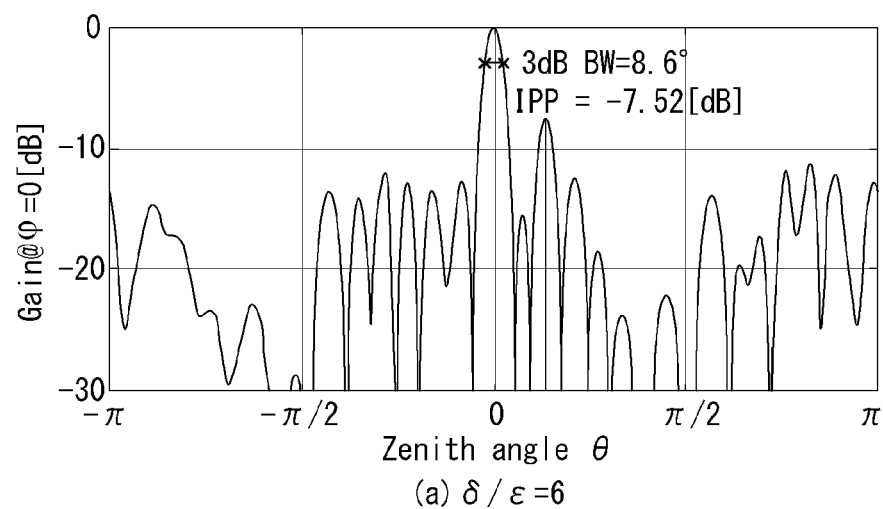
(a) $\delta/\varepsilon=6$

[FIG. 34]
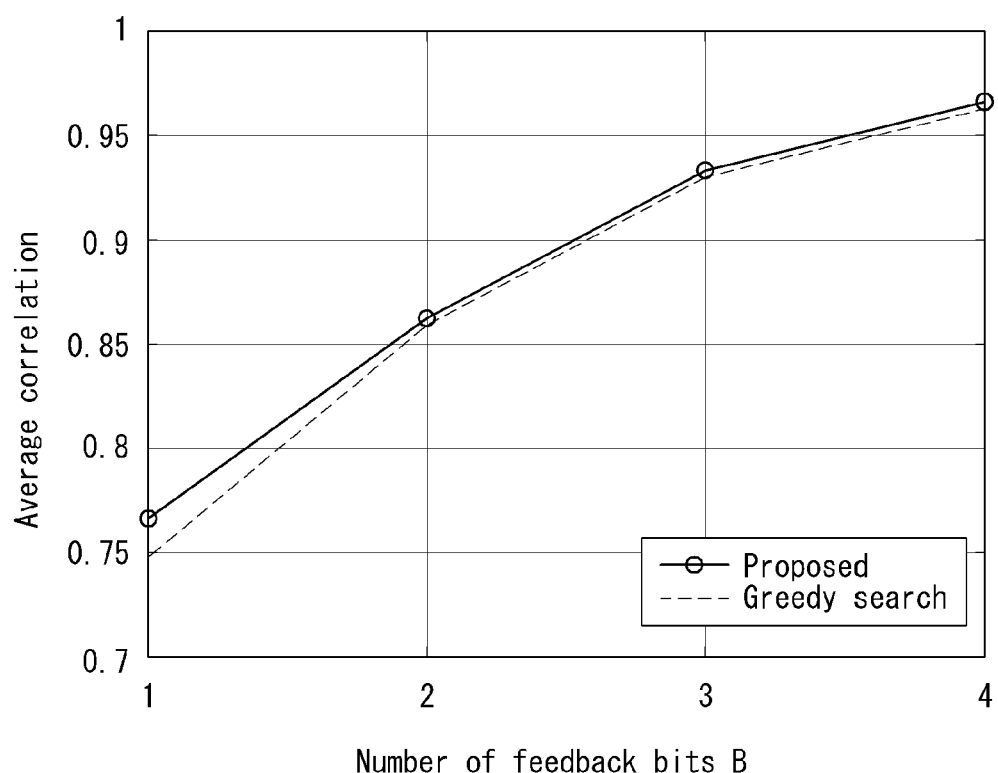

【FIG. 35】
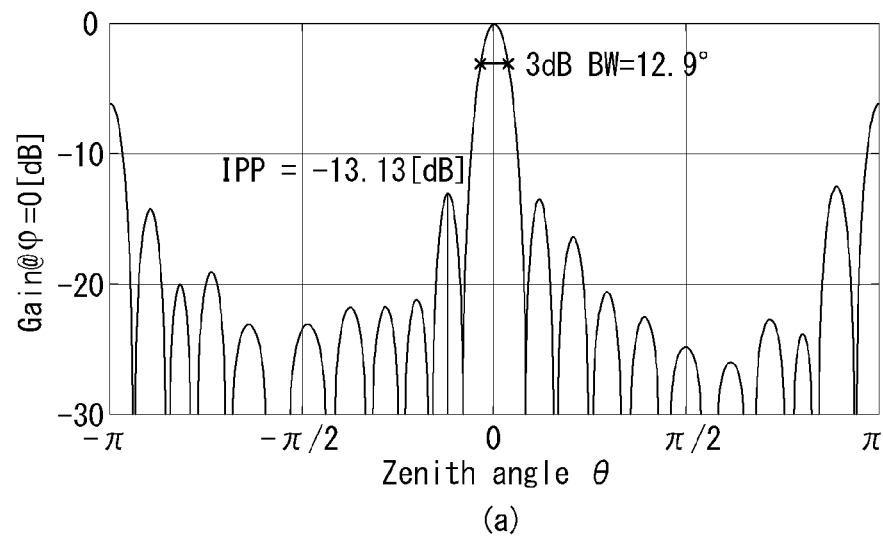
(a)
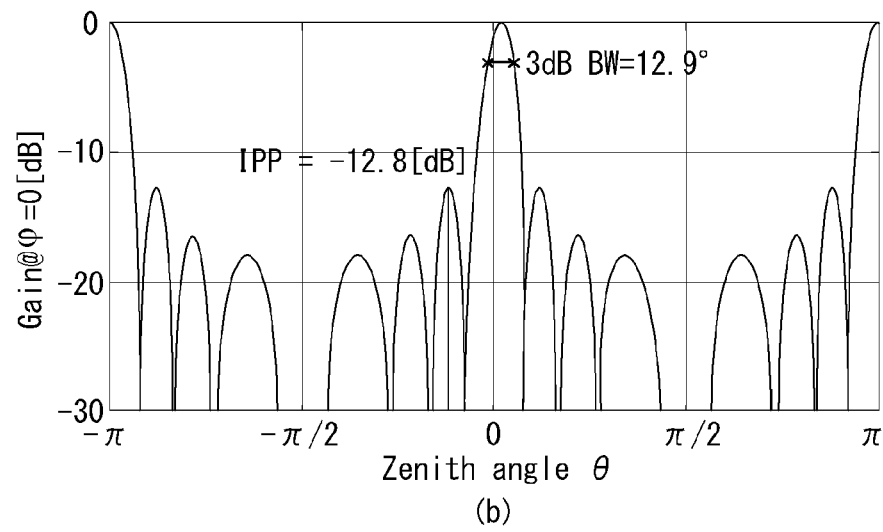
(b)

【FIG. 36】
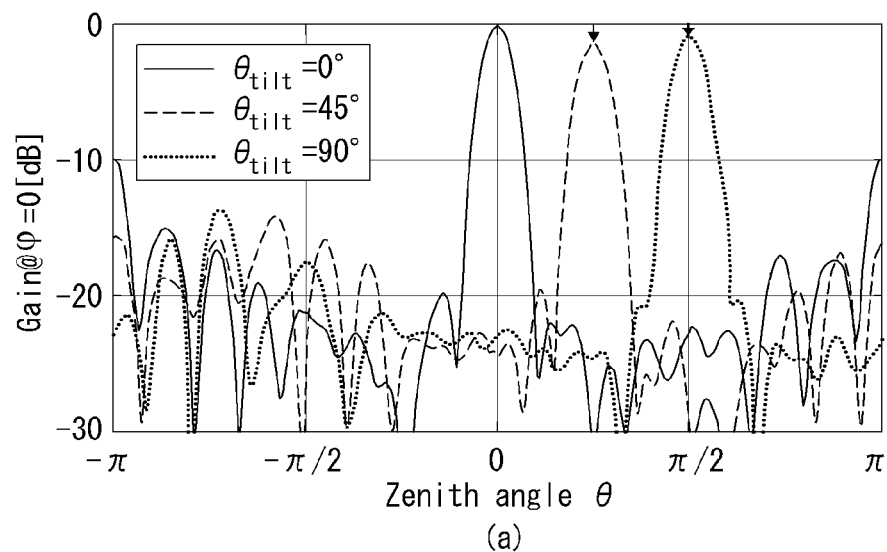
(a)
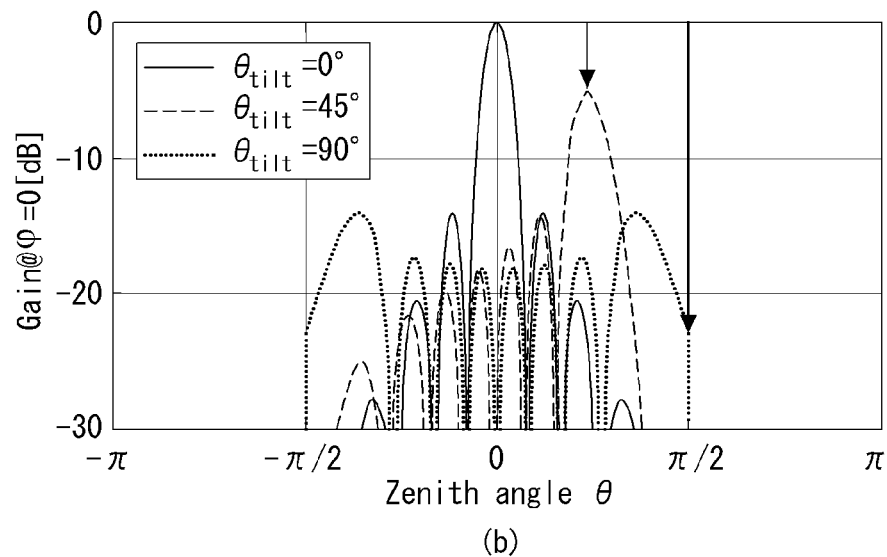
(b)

[FIG. 37]
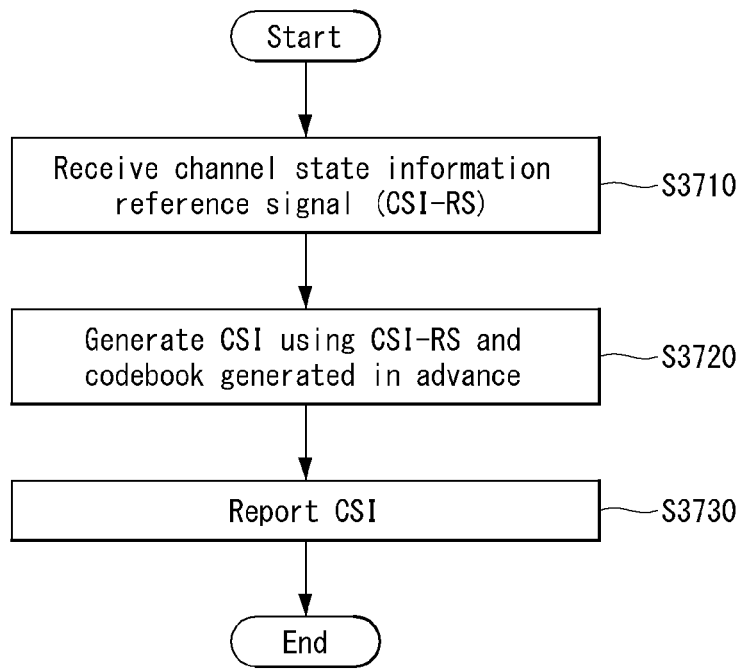

[FIG. 38]
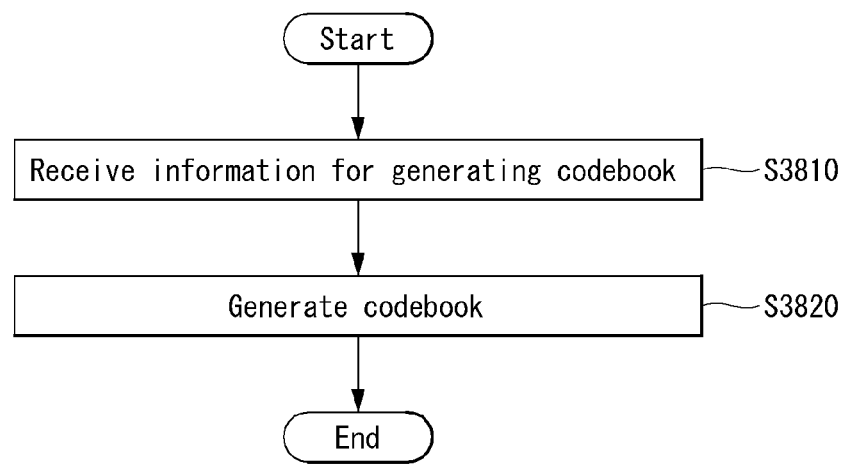

[FIG. 39]
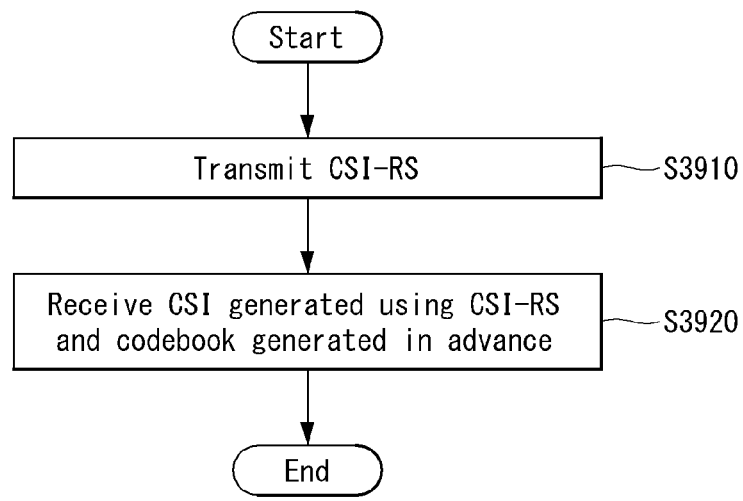

[FIG. 40]
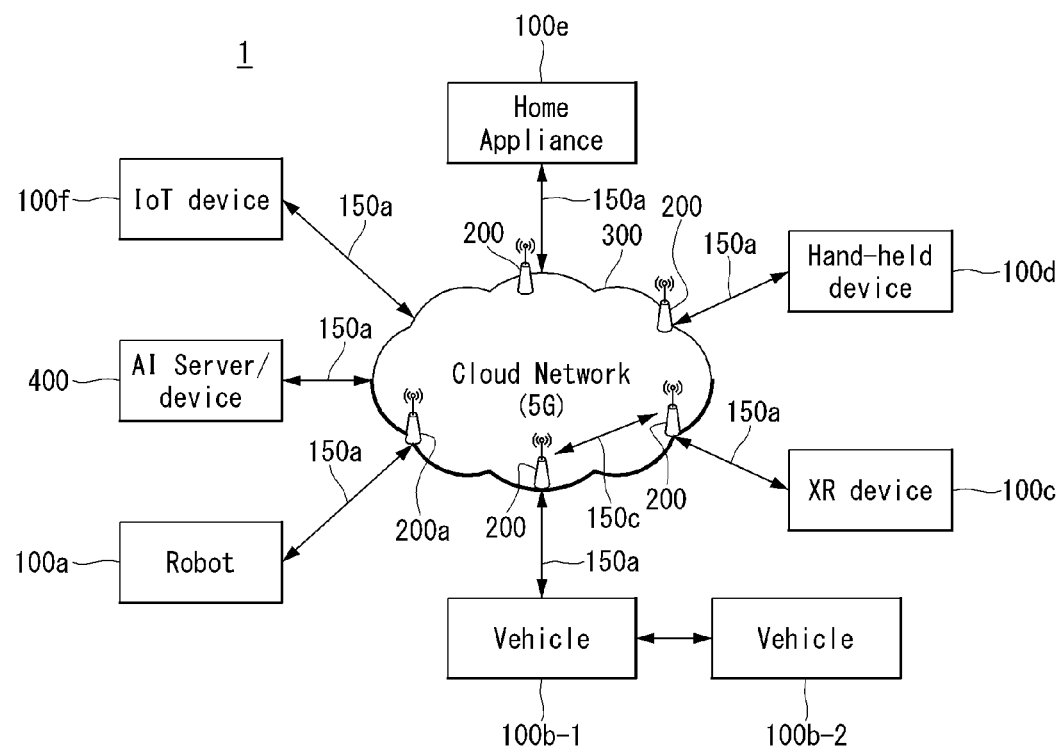

[FIG. 41]
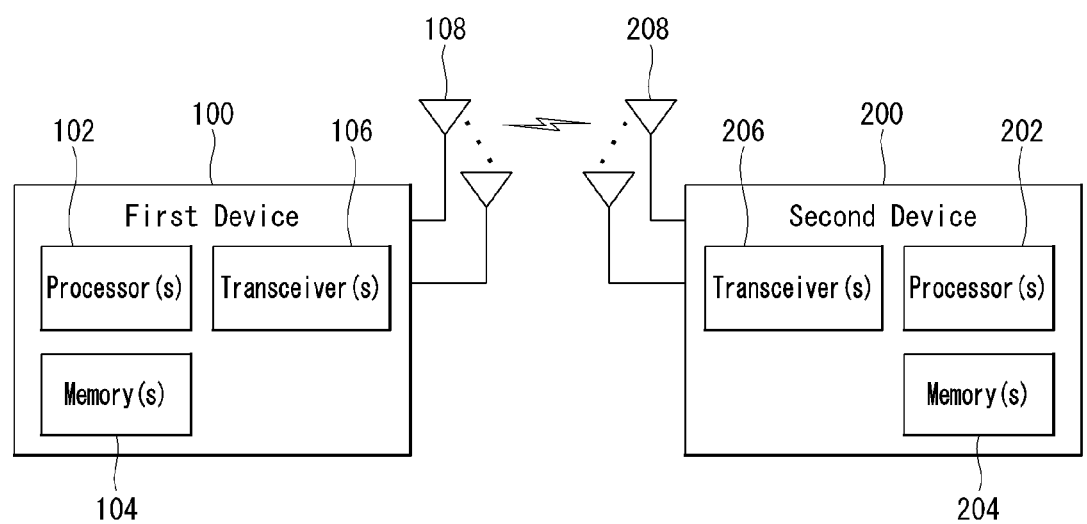

[FIG. 42]
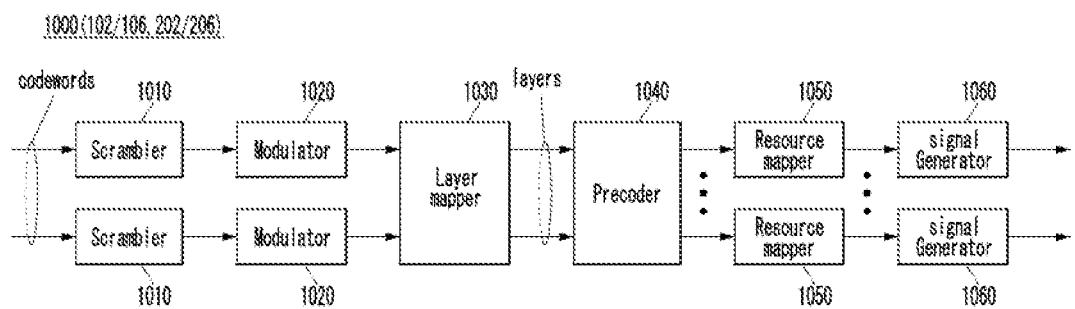

[FIG. 43]
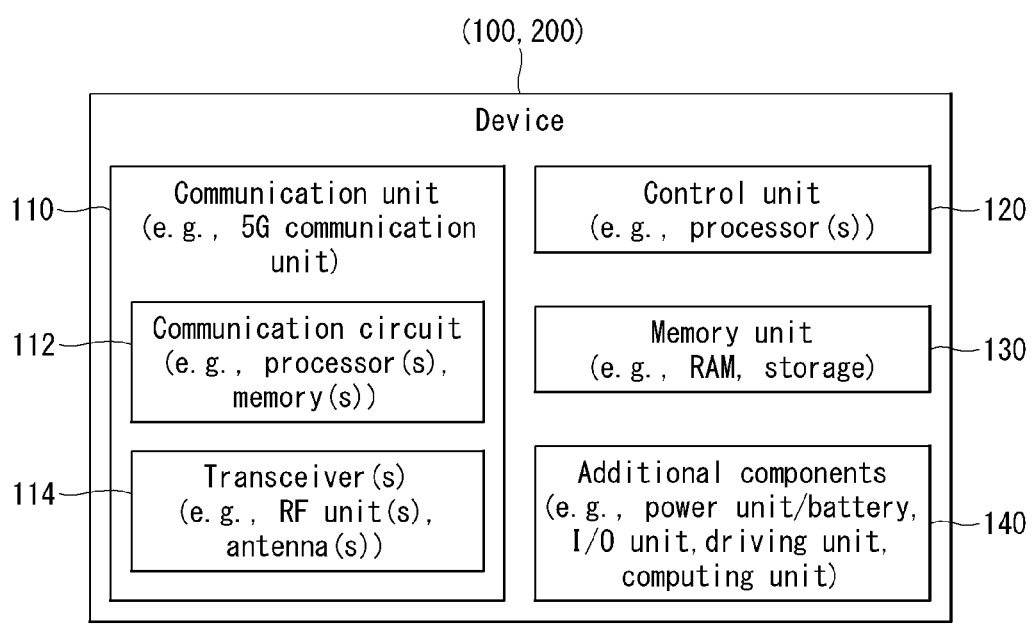

[FIG. 44]
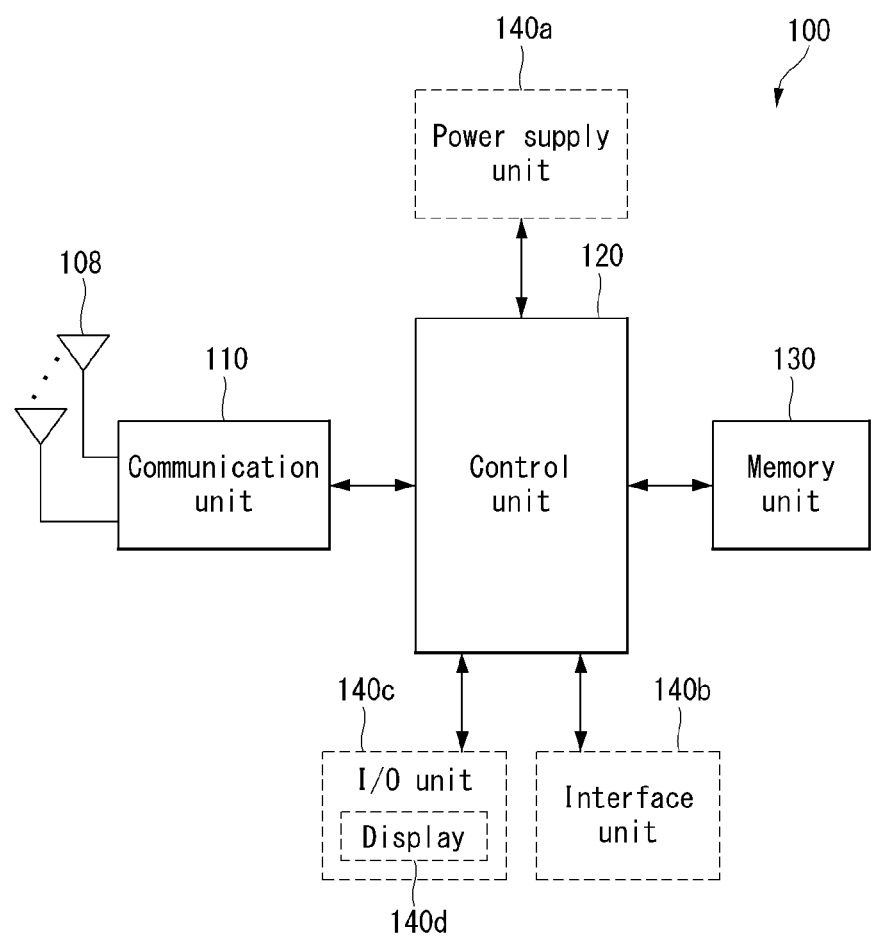

[FIG. 45]
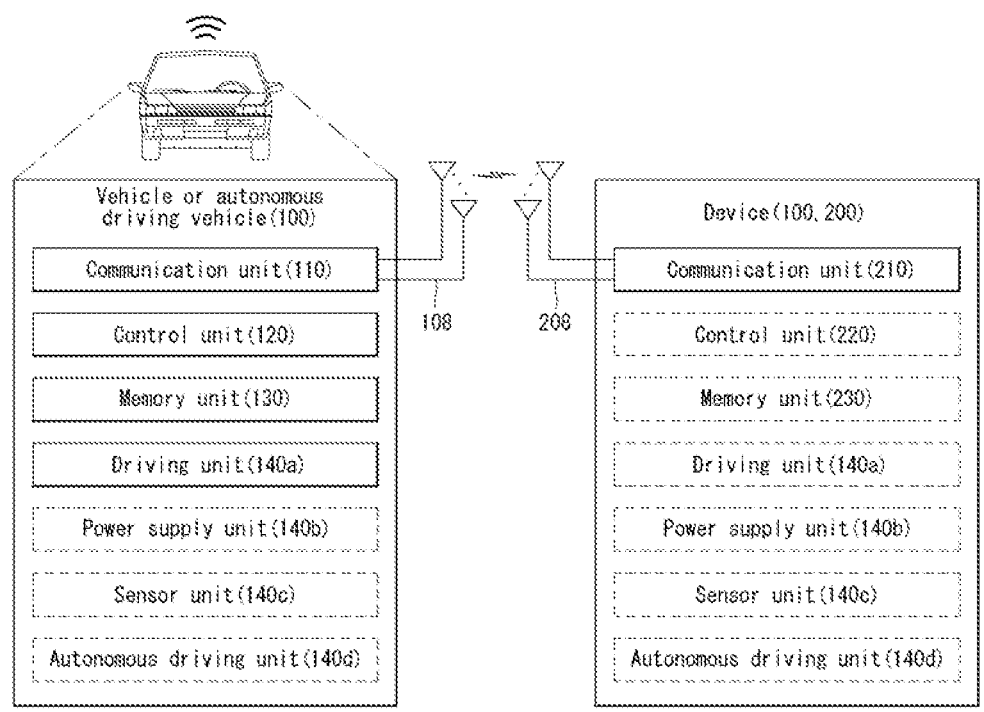

METHOD FOR REPORTING CHANNEL STATE INFORMATION IN ORDER FOR PERFORMING ANTENNA ARRAY-BASED BEAMFORMING IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/011515, filed on Sep. 5, 2019, which claims the benefit of earlier filing date and right of priority to Korean Application No. 10-2018-0105668, filed on Sep. 5, 2018, the contents of which are all incorporated by reference herein in their entirety.

TECHNICAL FIELD

The present disclosure relates to a method for reporting channel state information for performing antenna array-based beamforming in a wireless communication system, and a device therefor.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

An object of the present disclosure is to provide a method for reporting channel state information for performing antenna array-based beamforming, and a device therefor.

Further, an object of the present disclosure is to reduce feedback overhead using a specific codebook in response to a position of a UE in generation of the channel state information.

Further, an object of the present disclosure is to dynamically generate the specific codebook depending on a communication environment.

Further, an object of the present disclosure is to transform one codebook and use the same according to change in the position of the UE.

Technical objects to be achieved by the present disclosure are not limited to the aforementioned technical objects, and other technical objects not described above may be evidently understood by a person having ordinary skill in the art to which the present disclosure pertains from the following description.

Technical Solution

A method for reporting channel state information (CSI) by user equipment (UE) for beamforming based on an antenna array in a wireless communication system according to an embodiment of the present disclosure includes: receiving a channel state information reference signal (CSI-RS), generating channel state information using the CSI-RS and a codebook generated in advance; and reporting the channel state information, wherein the channel state information includes information related to a codevector determined in the codebook, the antenna array has a three-dimensional shape having omnidirectional symmetry, the codebook is generated based on a position of the UE having a center of the three-dimensional shape as an origin, and the position of the UE is represented based on a polar coordinate system.

Each of antennas included in the antenna array is a constant distance from the center of the three-dimensional shape and is arranged in one area of the surface of the three-dimensional shape such that each antenna is symmetrical to other antennas included in the antennas.

A whole space in which the antenna array transmits RF signals is partitioned into a plurality of sectors according to the three-dimensional shape, the codebook is generated for specific sectors among the plurality of sectors, and the position of the UE belongs to the specific sectors.

The codebook C is a set of a specific number Q of codevectors and is represented by the following equation, $$C=\{v_1, v_2, \ldots, v_Q\} \quad \text{[Equation]}$$

wherein v is a codevector and Q is $2^B$, B being a preset number of bits.

A codevector $v_q$ included in the codebook is represented by the following equation, $$v_q = [v_{q,0} v_{q,1} \cdots v_{q,M-1}]^T \quad \text{[Equation]}$$

wherein q is a natural number, $1 \leq q \leq Q$, M is a total number of antennas included in the antenna array, and T represents a transpose operation.

An element $v_{q,m}$ included in the codevector $v_q$ is a value for phase correction of each antenna included in the antenna array and is represented by the following equation,

[Equation]

$$v_{q,m} = e^{j2\pi \frac{r}{\lambda}(\sin\Theta_q \sin\theta_m \cos(\Phi_q - \phi_m) + \cos\Theta_q \cos\theta_m)}$$

wherein m is an index of each antenna included in the antenna array, $0 \leq m \leq M-1$, r is a distance between the center of the three-dimensional shape and each antenna, $\lambda$ is a wavelength according to a carrier frequency at which the CSI-RS is transmitted, $\theta_m$ is a zenith angle at a position of each antenna, $\phi_m$ is an azimuth angle at the position of each antenna, $\Theta_q$ is a zenith angle at a position of the codevector $v_q$ in the specific sectors, and $\Phi_q$ is an azimuth angle at a position of the codevector $v_q$ in the specific sectors.

Each sector included in the plurality of sectors is defined based on a local coordinate system (LCS) related to relative positions between an antenna positioned at the center of the sector and other antennas, the codebook is transformed into a codebook with respect to other sectors included in the plurality of sectors, and the transformation is performed in such a manner that the order of elements of each codevector included in the codebook is rearranged according to an LCS in the other sector.

The method further includes: receiving information for generating the codebook; and generating the codebook, wherein the information for generating the codebook includes the preset number B of bits and information on at least one of the specific sectors.

The information for generating the codebook is downlink control information (DCI).

The DCI is transmitted when the specific sectors change to sectors included in the plurality of sectors due to change of the position of the UE and further includes information indicating regeneration of the codebook or transformation of the codebook into the codebook with respect to the other sector.

Each sector included in the plurality of sectors is defined based on an LCS related to relative positions between an antenna positioned at the center of the sector and other antennas, and the transformation is performed in such a manner that the order of elements of each codevector included in the codebook is rearranged according to the LCS in the other sector.

A UE reporting channel state information (CSI) for beamforming based on an antenna array in a wireless communication system according to another embodiment of the present disclosure includes: a transceiver configured to transmit/receive RF signals; a memory; and a processor connected to the transceiver and the memory, wherein the processor is configured: to receive a channel state information reference signal (CSI-RS); to generate channel state information using the CSI-RS and a codebook generated in advance; and to report the channel state information, wherein the channel state information includes information related to a codevector determined in the codebook, the antenna array has a three-dimensional shape having omnidirectional symmetry, the codebook is generated based on a position of the UE having the center of the three-dimensional shape as an origin, and the position of the UE is represented based on a polar coordinate system.

A drone reporting channel state information (CSI) for beamforming based on an antenna array in a wireless communication system according to another embodiment of the present disclosure includes: a transceiver configured to transmit/receive RF signals; a memory; and a processor connected to the transceiver and the memory, wherein the processor is configured: to receive a channel state information reference signal (CSI-RS); to generate channel state information using the CSI-RS and a codebook generated in advance; and to report the channel state information, wherein the channel state information includes information related to a codevector determined in the codebook, the antenna array has a three-dimensional shape having omnidirectional symmetry, the codebook is generated based on a position of the drone having the center of the three-dimensional shape as an origin, and the position of the drone is represented based on a polar coordinate system.

Each of antennas included in the antenna array is a constant distance from the center of the three-dimensional shape and is arranged in one area of the surface of the three-dimensional shape such that each antenna is symmetrical to other antennas included in the antennas.

A whole space in which the antenna array transmits RF signals is partitioned into a plurality of sectors according to the three-dimensional shape, the codebook is generated by specific sectors among the plurality of sectors, and the position of the drone belongs to the specific sectors.

Advantageous Effects

According to an embodiment of the present disclosure, channel state information is generated using a codebook generated in advance. The codebook is generated based on a position of a UE in accordance with a three-dimensional shape of an antenna array. The three-dimensional shape has omnidirectional symmetry, and the position of the UE is specified in polar coordinates having the center of the three-dimensional shape as the origin. The present disclosure performs feedback of the channel state information and thus stable beamforming can be performed omnidirectionally in the three-dimensional space.

In addition, in the present disclosure, the codebook is generated for specific sectors to which the position of the UE belongs from among a plurality of sectors partitioned according to the three-dimensional shape, and thus overhead for feedback of the channel state information can be reduced.

Furthermore, the present disclosure receives information for codebook generation and generates the codebook, and the information for codebook generation includes a predetermined number of bits or at least one of the specific sectors. The present disclosure can generate the codebook by changing the number of bits or sectors, and thus beamforming can be performed adaptively to a communication environment.

Furthermore, in the present disclosure, the information for codebook generation is retransmitted upon change of the position of the UE and further includes information indicating transformation of the codebook into a codebook for other sectors. Transformation of the codebook is performed by rearranging the order of elements of each codevector included in the codebook using a local coordinate system (LCS) with respect to relative positions between an antenna positioned at the center of the sectors and the remaining antennas. Accordingly, beamforming can be performed rapidly and stably using a transformed codebook even in a communication environment suffering a wide range of incident angle variation, such as a drone.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram showing an example of an LTE radio frame structure.

FIG. 2 is a diagram showing an example of a resource grid for a downlink slot.

FIG. 3 shows an example of a downlink subframe structure.

FIG. 4 shows an example of an uplink subframe structure.

FIG. 5 illustrates a configuration of a general multiple-input multiple-output (MIMO) antenna communication system.

FIG. 6 illustrates channels from multiple transmit (Tx) antennas to a single reception (Rx) antenna.

FIG. 7 illustrates a downlink HARQ process in an LTE FDD system to which the present disclosure is applicable.

FIG. 8 illustrates an uplink HARQ process in an LTE FDD system to which the present disclosure is applicable.

FIG. 9 illustrates reference signal patterns mapped to downlink resource block pairs in a wireless communication system to which the present disclosure is applicable.

FIG. 10 illustrates a periodic CSI-RS transmission scheme in a wireless communication system to which the present disclosure is applicable.

FIG. 11 illustrates an aperiodic CSI-RS transmission scheme in a wireless communication system to which the present disclosure is applicable.

FIG. 12 illustrates a communication system using a spherical antenna array according to an embodiment of the present disclosure.

FIG. 13 is a diagram for describing a transmission path of an antenna with respect to a three-dimensional spherical coordinate system.

FIG. 14 illustrates a shape of an antenna array according to an embodiment of the present disclosure.

FIG. 15 illustrates a shape of one face of an antenna array according to an embodiment of the present disclosure when the face is partitioned.

FIG. 16 illustrates an antenna array shape when each face of an icosahedral antenna array is geodesic-partitioned according to an embodiment of the present disclosure.

FIG. 17 illustrates an antenna array shape when each face of a dodecahedral antenna array is geodesic-partitioned according to an embodiment of the present disclosure.

FIG. 18 illustrates an antenna array shape in which an antenna subarray is attached to vertexes of a regular icosahedron according to an embodiment of the present disclosure.

FIG. 19 is a diagram for describing transformation of a local coordinate system (LCS).

FIG. 20 are graphs for describing the performance of a regular icosahedral geodesic vertex antenna array according to an embodiment of the present disclosure according to the number of partitions and antenna spacing variation.

FIG. 21 are graphs for describing the performance of a regular dodecahedral geodesic vertex antenna array according to an embodiment of the present disclosure according to the number of partitions and antenna spacing variation.

FIG. 22 is a diagram for describing duality of a regular polyhedron.

FIG. 23 illustrates a sector model of an antenna array for generating a codebook according to an embodiment of the present disclosure.

FIG. 24 illustrates positions of codevectors included in a codebook according to an embodiment of the present disclosure.

FIG. 25 illustrates antenna positions of a regular icosahedral antenna according to an embodiment of the present disclosure.

FIG. 26 is a diagram illustrating LCSs for transforming a codebook and antenna positions in accordance with each LCS according to an embodiment of the present disclosure.

FIG. 27 is another diagram illustrating LCSs for transforming a codebook and antenna positions in accordance with each LCS according to an embodiment of the present disclosure.

FIG. 28 are graphs showing beam shapes for antenna spacing of a regular icosahedral antenna array.

FIG. 29 are graphs showing beam shapes for spacing between neighboring antennas of a regular icosahedral geodesic 2-partition antenna array.

FIG. 30 are graphs showing beam shapes for spacing between neighboring antennas of a regular icosahedral geodesic 3-partition antenna array.

FIG. 31 are graphs showing beam shapes for spacing between neighboring antennas of a regular icosahedral geodesic 4-partition antenna array.

FIG. 32 are graphs showing beam shapes of a regular icosahedral antenna array including a 2*2 subarray.

FIG. 33 are graphs showing beam shapes of a regular icosahedral antenna array including a 3*3 subarray.

FIG. 34 is a graph showing average correlation of a codebook for a regular icosahedral antenna array according to the number of feedback bits.

FIG. 35 are graphs showing a comparison between beam shapes of a spherical array according to an embodiment of the present disclosure and beam shapes of a conventional antenna array.

FIG. 36 are graphs showing a comparison between beam shapes when a beam direction changes in the spherical array according to an embodiment of the present disclosure and those in the conventional antenna array.

FIG. 37 is a flowchart illustrating a method for reporting channel state information by a UE in order to perform antenna array-based beamforming in a wireless communication system according to an embodiment of the present disclosure.

FIG. 38 is a flowchart illustrating generation of a codebook in detail in the method of reporting channel state information according to an embodiment of the present disclosure.

FIG. 39 is a flowchart illustrating a method for receiving channel state information by a base station in order to perform antenna array-based beamforming in a wireless communication system according to an embodiment of the present disclosure.

FIG. 40 illustrates a communication system 1 applied to the present disclosure.

FIG. 41 illustrates a wireless device applicable to the present disclosure.

FIG. 42 illustrates a signal processing circuit applied to the present disclosure.

FIG. 43 illustrates another example of a wireless device applied to the present disclosure.

FIG. 44 illustrates a portable device applied to the present disclosure.

FIG. 45 illustrates a vehicle or a self-driving vehicle applied to the present disclosure.

MODE FOR DISCLOSURE

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present disclosure.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and these specific terms may be replaced with other terms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

For clarity, this application focuses on the 3GPP LTE/LTE-A. However, technical features of the present disclosure are not limited thereto.

LTE System in General

FIG. 1 is a diagram showing an example of an LTE radio frame structure.

In FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 2 is a diagram showing an example of a resource grid for a downlink slot.

In FIG. 2, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 3 shows an example of a downlink subframe structure.

In FIG. 3, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 4 shows an example of an uplink subframe structure.

In FIG. 4, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:

Type 1: applicable to FDD
Type 2: applicable to TDD
Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s = [s_1, s_2, \ldots, s_{N_T}]^T \qquad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y = [y_1, y_2, \ldots, y_{N_R}]^T \qquad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \ldots, h_{iN_T}] \qquad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix}$$ [Equation 8]

Meanwhile, since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \ldots, n_{N_T}]$$ [Equation 9]

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R)$$ [Equation 11]

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Coordinated Multi-Point Transmission and Reception (COMP)

According to a demand of LTE-advanced, CoMP transmission is proposed in order to improve the performance of the system.

The CoMP is also called co-MIMO, collaborative MIMO, network MIMO, and the like. It is anticipated that the CoMP will improves the performance of the terminal positioned at a cell edge and improve an average throughput of the cell (sector).

In the present disclosure, an eNB, an access point, and a cell have the same meaning.

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the case of the JP scheme, data from each eNB that performs CoMP to a UE is instantaneously simultaneously transmitted to the UE, and the UE improves reception performance by combining signals from each eNB. On the other hand, in the case of CS/CB, data to one UE is instantaneously transmitted through one eNB, and scheduling or beamforming is performed such that interference of the UE with respect to other eNBs is minimized.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Hybrid-Automatic Repeat and request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

FIG. 7 is a diagram illustrating a downlink HARQ process in an LTE FDD system, and FIG. 8 is a diagram illustrating an uplink HARQ process in an LTE FDD system.

The respective HARQ processes are defined by a unique HARQ process identifier of 3-bit size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV which is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

On the other hand, the uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

The object of the Limited Buffer Rate Matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of a UE, the code bit is transmitted in the virtual circular buffer (VCB) that may be stored in the HARQ soft buffer of the UE for all of the given TB (re)transmissions.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using a distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 9 illustrates a reference signal pattern mapped to a downlink resource block pair in the wireless communication system to which the present disclosure can be applied.

Referring to FIG. 9, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 9a) and a length of 12 OFDM symbols in the case of an extended cyclic prefix (CP) (FIG. 9b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad [\text{Equation 12}]$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents a modulo operation. The position of the reference signal varies depending on the $v_{shift}$ value in the frequency domain. Since $v_{shift}$ depends on the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \qquad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

FIG. 10 illustrates a periodic transmission scheme of CSI-RS in a wireless communication system to which the present disclosure may be applied.

As shown in FIG. 10, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to a UE, the UE measures the CSI-RS of the eNB on the corresponding position using the value and reports the information such as CQI/PMI/RI, etc. to the eNB. The all types of the information related to the CSI-RS are cell-specific information.

FIG. 11 illustrates an aperiodic transmission scheme of CSI-RS in a wireless communication system to which the present disclosure may be applied.

FIG. 11 exemplifies the scheme that the CSI-RS is transmitted with a transmission subframe pattern. The CSI-RS transmission pattern includes 10 subframes, and whether to transmit the CSI-RS is designated by 1-bit indicator in each subframe.

Generally, following two schemes are considered as the scheme that an eNB notifies the CSI-RS configuration to a UE.

First, a first scheme of using the Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, a second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

Contents described with reference to FIGS. 1 to 11 can be applied to clarify or embody the present disclosure. Hereinafter, matters with respect to beamforming depending on a communication environment will be described in detail. Methods and embodiments which will be described below are divided for convenience of description, and a part of a certain method may be substituted with or combined with a part of another method.

Traffic of mobile data increases very rapidly, and communication environments in different forms from conventional infrastructures due to necessity for transmission/reception devices in various forms. Research and development for improved wireless transmission schemes are being conducted in accordance with increasing data demand and diversity of distributions of positions of transceivers and such research focuses on high spectrum efficiency, improvement of communication system operation on a network, and a wide operation range.

As technologies having potential to realize the aforementioned conditions, there are massive multi-input multi-output (massive MIMO) transmission, D2D, three-dimensional beamforming, etc., which use advantages obtained by using multiple antennas for communication.

Beamforming using multiple antennas is easily realized as the size of a multi-antenna array is reduced using millimeter waves. 5G NR (New Ratio) has more various types of channel station information (CSI) between eNBs and users than 4G LTE (Long-term evolution), and technology such as BM (beam management) using 5G NR is expected to be used. Current technology and standards specialized in uniform linear array (ULA) and sector partitioning is designed in accordance with horizontal elements. For extension to 3D beamforming considering high degree of change, standardization for multi-antenna transmission schemes using a 2-dimensional antenna array has been conducted. However, due to utilization of a 2-dimensional uniform rectangular array in which a ULA is repeatedly arranged, stable data transmission is restricted when a user position largely deviates from a direction of the front of the array.

The present disclosure proposes a spherical antenna array capable of achieving 3D beamforming having high spectrum efficiency in various user positions and transmission/reception environments. The proposed spherical antenna array has uniform and stable transmission performance in all directions through antenna element arrangement in a repeated pattern and provides communication infrastructure environments in which it is possible to flexibly cope with radical change in a signal incident angle. An example of such communication infrastructure environment is illustrated in FIG. 12.

FIG. 12 illustrates a communication system using a spherical antenna array according to an embodiment of the present disclosure.

A system model representing an example of construction of a communication system using the above-proposed spherical antenna array is shown in FIG. 12. According to this system model, efficient beamforming can be performed in a communication environment suffering a wide range of incident angle variation by using 3D beamforming. In addition, the present disclosure proposes a three-dimensional multi-sector partitioning method suitable for the spherical antenna array and a beamformer and codebook determination method suitable for partitioned sectors.

The present disclosure proposes a method of determining a shape of a spherical antenna array, a formula for generating a beamformer using the determination method, control of a beam shape, a sector partitioning method suitable for an antenna array, generation of a codebook per sector, and a method of applying the same to a cellular mobile communication system. Hereinafter, the contents of proposal are classified and described in detail.

Hereinafter, a configuration of a spherical array and beamforming using the same will be described in detail.

According to an embodiment, a method of using antenna elements arranged on a regular polyhedron to construct an antenna array may be considered.

Specifically, antenna elements are disposed at vertexes or centers of faces of the regular polyhedron to form an array and the array is used for beamforming. In addition, a three-dimensional antenna is modeled on a three-dimensional spherical coordinate system in order to generate a beamformer using the antenna array shape. This will be described below with reference to FIG. 13.

When a transmission path of an antenna element disposed at an arbitrary position is geometrically modeled using parameters of the three-dimensional spherical coordinate system illustrated in (a) of FIG. 13, the result as illustrated in (b) of FIG. 13 is obtained. The center of gravity of the regular polyhedron for arranging antennas is set to the origin 0, an m-th antenna is defined as Am, and coordinates of the antenna are represented by $A_m(r_m, \theta_m, \phi_m)$. Coordinates of a user that performs transmission and reception are set to $U(\rho,\theta,\phi)$.

Hereinafter, generation of a beamformer of the spherical antenna array will be described with reference to (c) of FIG. 13.

To generate the beamformer, a relative position of the antenna is modeled using the three-dimensional spherical coordinate system. A distance difference $d_m$ between a path between the origin and the user $U(\rho, \theta, \phi)$ and a path between the antenna coordinates $A_m(r_m, \theta_m, \varphi_m)$ and the user $U(\rho, \theta, \phi)$. That is, the path difference $d_m$ is a value obtained by subtracting a path length of a beam transmitted from the origin 0 from a path length of a beam transmitted from the antenna $A_m$. It is assumed that beams transmitted from antennas to the user are parallel. Spherical coordinate values of the user and the antenna are converted into rectangular coordinate values as represented by Equation 15.

$$A_m = [r_m \cos \phi_m \sin \theta_m, r_m \sin \phi_m \sin \theta_m, r_m \cos \theta_m]$$

$$U = [\rho \cos \Phi \sin \Theta, \rho \sin \Phi \cos \Theta, \rho \cos \Theta] \quad \text{[Equation 15]}$$

The path difference $d_m$ is determined by the following Equation 16.

$$d_m = -u \cdot \overrightarrow{OA_m}, \text{ (here, } u \text{ is a unit vector of } \overrightarrow{OU}\text{)}$$

$$d_m = -[\cos \Phi \sin \Theta, \sin \Phi \sin \Theta, \cos \Theta] \cdot [r_m \cos \phi_m \sin \theta_m, r_m \sin \phi_m \sin \theta_m, r_m \cos \theta_m]$$

$$d_m = -r_m[\cos \Phi \sin \Theta \cos \phi_m \sin \theta_m + \sin \Phi \sin \Theta \sin \phi_m \sin \theta_m + \cos \Theta \cos \theta_m]$$

$$d_m = -r_m[\sin \Theta \sin \theta_m \cos(\Phi - \phi_m) + \cos \Theta \cos \theta_m] \quad \text{[Equation 16]}$$

A more specific derivation process is as follows.

When a value obtained by subtracting the distance of the path of the beam transmitted from the antenna at the position $A_m$ to the user U from the distance of the path of the beam transmitted from the origin 0 to the user U is $d_m$, this is represented as a vector $d_m = \overrightarrow{A_m A'_m} - \overrightarrow{OU}$. That is, $d_m$ can be derived through the following process.

$$\overrightarrow{A_m A'_m} - \overrightarrow{OU} \quad \text{①}$$

$$= \left(\overrightarrow{OA'_m} - \overrightarrow{OA_m}\right) - \overrightarrow{OU}$$

$$= \left(\overrightarrow{OA'_m} - \overrightarrow{OU}\right) - \overrightarrow{OA_m}$$

$$= \overrightarrow{UA'_m} - \overrightarrow{OA_m}$$

$$\therefore \overrightarrow{A_m A'_m} - \overrightarrow{OU} = \overrightarrow{UA'_m} - \overrightarrow{OA_m}$$

When scalar product of $$\frac{\overrightarrow{OU}}{|\overrightarrow{OU}|}$$

is applied to the left side of ①, the following is obtained.

$$\left(\overrightarrow{A_m A'_m} - \overrightarrow{OU}\right) \cdot \frac{\overrightarrow{OU}}{|\overrightarrow{OU}|} \quad \text{②}$$

$$= \overrightarrow{A_m A'_m} \cdot \frac{\overrightarrow{OU}}{|\overrightarrow{OU}|} - \overrightarrow{OU} \cdot \frac{\overrightarrow{OU}}{|\overrightarrow{OU}|}$$

$$= \overrightarrow{A_m A'_m} \cdot \frac{\overrightarrow{A_m A'_m}}{|\overrightarrow{A_m A'_m}|} - \overrightarrow{OU} \cdot \frac{\overrightarrow{OU}}{|\overrightarrow{OU}|} \left(\because \overrightarrow{A_m A'_m} // \overrightarrow{OU}\right)$$

$$= \frac{|\overrightarrow{A_m A'_m}|^2}{|\overrightarrow{A_m A'_m}|} - \frac{|\overrightarrow{OU}|^2}{|\overrightarrow{OU}|} \left(\because \vec{a} \cdot \vec{a} = |\vec{a}|^2\right)$$

$$= |\overrightarrow{A_m A'_m}| - |\overrightarrow{OU}| \left(\because |\overrightarrow{OU}| \neq 0, |\overrightarrow{A_m A'_m}| \neq 0\right)$$

When scalar product of $$\frac{\overrightarrow{OU}}{|\overrightarrow{OU}|}$$

is applied to the right side of ①, the following is obtained.

$$\left(\overrightarrow{UA'_m} - \overrightarrow{OA_m}\right) \cdot \frac{\overrightarrow{OU}}{|\overrightarrow{OU}|} \qquad \text{③}$$

$$= \overrightarrow{UA'_m} \cdot \frac{\overrightarrow{OU}}{|\overrightarrow{OU}|} - \overrightarrow{OA_m} \cdot \frac{\overrightarrow{OU}}{|\overrightarrow{OU}|}$$

$$= -\overrightarrow{OA_m} \cdot \frac{\overrightarrow{OU}}{|\overrightarrow{OU}|} \quad \left(\because \overrightarrow{UA'_m} \perp \overrightarrow{OU}, \vec{a} \perp \vec{b} \sim \vec{a} \cdot \vec{b} = 0\right)$$

According to ①, ②, and ③, $$d_m = |\overrightarrow{AmA'_m}| - |\overrightarrow{OU}| = -\overrightarrow{OA_m} \cdot \frac{\overrightarrow{OU}}{|\overrightarrow{OU}|}$$

is obtained.

A phase value of a channel for each antenna element is $$2\pi \frac{d_m}{\lambda}$$

and λ means a wavelength of a carrier frequency. A beamformer component for compensating for a phase component is set to $$v_m = e^{-j2\pi \frac{d_m}{\lambda}},$$

and a beamformer in the direction of U(ρ, θ,ϕ) is determined using Equation 16 for an array composed of M antenna elements $A_0, A_1, \ldots, A_{M-1}$ which is represented by the following Equation 17.

$$v = [v_0, \ldots, v_{M-1}]^T \qquad \text{[Equation 17]}$$

$$v = \left[e^{-j2\pi \frac{d_0}{\lambda}}, \ldots, e^{-j2\pi \frac{d_{M-1}}{\lambda}}\right]^T$$

$$= \left[e^{j2\pi \frac{r_0}{\lambda}[\sin\Theta\sin\theta_0\cos(\Phi-\phi_0)+\cos\Theta\cos\theta_0]}, \ldots, \right.$$

$$\left. e^{j2\pi \frac{r_{M-1}}{\lambda}[\sin\Theta\sin\theta_{M-1}\cos(\Phi-\phi_{M-1})+\cos\Theta\cos\theta_{M-1}]}\right]^T$$

When the antenna elements are positioned in the same radius from the origin in Equation 17, the relationship of $r_0 = r_1 = \ldots = r_{M-1}(=r)$ is established.

Regular polyhedrons such as a regular tetrahedron, a regular hexahedron, a regular octahedron, a regular dodecahedron, and a regular icosahedron can be used for array configuration. An antenna array configured using a regular icosahedron will be described below with reference to FIG. 14.

FIG. 14 illustrates a shape of an antenna array according to an embodiment of the present disclosure.

Antennas are disposed at the vertexes of a regular icosahedron in (a) of FIG. 14 and antennas are disposed at the centers of the faces of the regular icosahedron in (b) of FIG. 14. Each point is an antenna position, and spacing between antennas can be adjusted by increasing or decreasing a distance between the origin and antennas.

According to an embodiment, a method of using a polyhedron generated using geodesic partitioning may be considered to configure an antenna array. This will be described with reference to FIGS. 15 to 17.

A geodesic partitioning method for a regular polyhedron is performed through the following process.

In the case of a regular icosahedron, each face corresponding to a regular triangle is partitioned by a number n of partitions into a plurality of regular triangles having the same size and shape. Here, when the length of the side of the regular icosahedron is 1, the length of the side of the regular triangles partitioned by the number n of partitions is 1/n. Shapes of partitioned faces of the regular icosahedron to which the aforementioned process is applied are illustrated in (a) of FIG. 15.

In the case of a regular dodecahedron, each face corresponding to a regular pentagon is partitioned into five triangles having the same size and shape for 2 partitions. For 3 partitions or more, the triangles generated in 2 partitions are partitioned through the same method for a regular icosahedron. Shapes of partitioned faces of the regular dodecahedron are illustrated in (b) of FIG. 15.

A geodesic polyhedron can be generated by moving vertexes newly generated through the aforementioned partitioning to positions to which orthogonal projection from the center of a regular polyhedron to the circumscribed spherical surface is performed. Antennas are disposed at the vertexes or the centers of the faces of the geodesic polyhedron to configure an array. Examples of antenna arrays using such a geodesic polyhedron are illustrated in FIG. 16 and FIG. 17.

Antenna arrays using a geodesic regular icosahedron can be configured as illustrated in (a) of FIG. 16 to (f) of FIG. 16. Antenna arrays using a geodesic regular dodecahedron can be configured as illustrated in (a) of FIG. 17 to (f) of FIG. 17. In the figures, points indicate antenna elements. Antennas are disposed at vertexes in (a), (c) and (e) and antennas are disposed at the centers of faces in (b), (d) and (f). Regarding the number of partitions, (a) and (b) show 2 partitions, (c) and (d) show 3 partitions, and (e) and (f) show 4 partitions.

Beamforming can be performed using antenna arrays configured in this manner.

According to an embodiment, a method of using a subarray to configure an antenna array may be conceived.

In the above-described embodiment, a single antenna is disposed at a vertex or a face of a corresponding regular polyhedron. In the present embodiment, a spherical array is configured by attaching a subarray such as a square arrangement instead of a single antenna.

Spacing between antennas positioned in a subarray is designed based on ½ of a user carrier band wavelength value and may be changed as necessary. Examples of spherical antenna arrays configured by attaching subarrays are illustrated in FIG. 18.

FIG. 18 illustrates spherical antenna arrays in which subarrays are attached to the vertexes of a regular icosahedron. 2×2 subarrays are arranged in (a) of FIGS. 18 and 3×3 subarrays are arranged in (b) of FIG. 18. The size of a subarray and the number of individual antenna elements present in the subarray may be adjusted as necessary. A distance between the centers of neighboring subarrays is determined within a range in which the subarrays do not overlap, and subarrays may be designed such that the distance increases twice in the case of 2×2 subarrays and three times in the case of 3×3 subarrays as compared to a case in which a single antenna is used.

Hereinafter, a method of generating a beamformer for a spherical antenna array including subarrays will be described in detail.

A beamforming formula can also be determined in a user direction for an antenna shape including subarrays at positions of M antenna elements. To this end, a local coordinate system (LCS) that defines a user position for each boresight of subarrays is used. When unit vectors indicating directions of x, y and z axes are defined as i, j and k, and unit vectors indicating directions of x, y and z axes of the LCS corresponding to an m-th subarray having a center positioned at $A_m(r_m, \theta_m, \varphi_m)$ are defined as i", j" and k" in a global coordinate system (GCS), a relationship between the defined unit vectors can be derived as follows. This will be described in detail with reference to FIG. 19.

FIG. 19 is a diagram for describing transformation of the LCS.

Referring to FIG. 19, in step 1 in the LCS transformation process, unit vectors corresponding to the x, y and z axes are represented as i, j and k and the x axis and the y axis are rotated by $\varphi$ on the xy planes. Unit vectors i', j' and k' corresponding to newly generated x', y' and z' axes are determined as $i' = i \cos \varphi + j \sin \varphi$ $j' = i \sin \varphi + j(-\cos \varphi)$ $k' = k$ This is represented as the following determinant.

$$\begin{bmatrix} i' \\ j' \\ k' \end{bmatrix} = \begin{bmatrix} \cos\varphi & \sin\varphi & 0 \\ \sin\varphi & -\cos\varphi & 0 \\ 0 & 0 & 1 \end{bmatrix} \begin{bmatrix} i \\ j \\ k \end{bmatrix}$$

In step 2, the x' axis and the z' axis are rotated by $\theta$ on the x'z' plane with respect to the newly generated rectangular coordinate system x', y', z'. Accordingly, unit vectors i", j" and k" corresponding to additionally generated x", y" and z" axes have the following relationship.

$i'' = i' \cos \theta + (-\sin \theta)$ $j'' = j'$ $k'' = i' \sin \theta + k' \cos \theta$ This is represented as the following determinant.

$$\begin{bmatrix} i'' \\ j'' \\ k'' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} i' \\ j' \\ k' \end{bmatrix}$$

When step 1 and step 2 are combined, the LCS transformation formula is represented by the following Equation 18.

$$\begin{bmatrix} i'' \\ j'' \\ k'' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} \cos\varphi & \sin\varphi & 0 \\ \sin\varphi & -\cos\varphi & 0 \\ 0 & 0 & 1 \end{bmatrix}$$ [Equation 18]

$$\begin{bmatrix} i \\ j \\ k \end{bmatrix} = \begin{bmatrix} \cos\theta\cos\varphi & \cos\theta\sin\varphi & -\sin\theta \\ -\sin\varphi & \cos\varphi & 0 \\ \sin\theta\cos\varphi & \sin\theta\sin\varphi & \cos\theta \end{bmatrix} \begin{bmatrix} i \\ j \\ k \end{bmatrix}$$

Here, subarrays are present on a plane formed by a linear combination of unit vectors i" and j". A beamformer is generated based on the coordinate system transformed as described above and used for beamforming for a spherical antenna array including subarrays.

Hereinafter, beam shape control through array structure transformation will be described in detail.

According to an embodiment, a method of controlling a beam shape by adjusting the number of elements of an array according to adjustment of the number of geodesic partitions may be conceived. Specifically, the number of antenna elements present in an array can be increased to improve beamforming performance. To this end, increasing of the number of geodesic partitions according to the above-described embodiment may be used.

Total numbers of antenna elements depending on the number of partitions are shown in Table 1 and Table 2. Table 1 shows numbers of antenna elements of a geodesic icosahedral spherical array and Table 2 shows numbers of antenna elements of a geodesic dodecahedral spherical array.

TABLE 1

| Antenna position | 1 partition (not partitioned) | 2 partitions | 3 partitions | 4 partitions |
|---|---|---|---|---|
| Vertex | 12 | 42 | 92 | 162 |
| Center of face | 20 | 80 | 180 | 320 |

TABLE 2

| Antenna position | 1 partition (not partitioned) | 2 partitions | 3 partitions | 4 partitions |
|---|---|---|---|---|
| Vertex | 20 | 32 | 122 | 272 |
| Center of face | 12 | 60 | 240 | 540 |

The number of antenna elements increases as the number of geodesic partitions increases as above. Accordingly, the width of a main beam for user data transmission decreases and power of sidelobe is reduced.

According to an embodiment, a method of adjusting the number of elements of an array to control a beam shape by changing the size of a subarray may be conceived.

Specifically, the number of antenna elements present in an array can be increased for improvement of beamforming performance. In the case of an antenna array using subarrays according to the above-described embodiment, the number of antenna elements can be increased by increasing the number of antennas per subarray. When there are M subarrays and the number of elements per subarray is N, a total number of elements of a generated antenna array is M×N.

According to an embodiment, a method of controlling a beam shape by adjusting the size of a spherical array may be conceived.

When an antenna array is configured according to the above-described embodiments, the size of the array can be changed by adjusting spacing between neighboring antennas, and thus different beam shapes are generated. Antenna spacing is represented as $\kappa_n$ which means a value obtained by dividing a minimum value of a distance between neighboring antennas by a wavelength of a used band. The subscript n is used to indicate the number of partitions. Characteristics of a beam are evaluated using a 3 dB beamwidth that represents a beamwidth at a point at which power of a main beam becomes ½ and interference peak power (IPP) at an angle within a main beam direction ±90°, and it is desirable to adjust the 3 dB beamwidth to be less than a predetermined level while minimizing the IPP.

Beam characteristic performance indexes depending on antenna spacing change are as illustrated in FIG. 20 and FIG. 21. FIG. 20 illustrates characteristic performance of a regular icosahedral geodesic vertex antenna and FIG. 21 illustrates characteristic performance of a regular dodecahedral geodesic vertex antenna. (a) shows IPP of an interference beam depending on the number n of partitions and antenna spacing and (b) shows a 3 dB beamwidth depending on the number n of partitions and antenna spacing.

Referring to FIG. 20 and FIG. 21, the IPP value of the interference beam can be maintained at low levels when antenna spacing is $\kappa_n$=0.5 and 0.75. Accordingly, the number of partition is selected and applied according to a required 3 dB beamwidth. For example, to maintain the 3 dB beamwidth to be less than 20°, an array structure in which antennas are disposed at the vertexes of 3-partition geodesic regular icosahedron having a value of $\kappa_n$=0.5 can be adopted.

According to an embodiment, a method of controlling a beam shape by adjusting a radiation pattern for each antenna element may be conceived.

Specifically, a beam shape of an array may be controlled according to a radiation pattern or a gain pattern for each antenna element, and the number of elements contributing to a beam shape changes. Accordingly, beam shape control can be performed using an antenna having an appropriate gain pattern and multi-user and multi-rank transmission can be performed using antenna resources that do not contribute a beam shape.

Hereinafter, specific methods of applying the above-described embodiments to cellular mobile communication systems will be described.

According to an embodiment, a method of using a sector partitioning method when a spherical array is used may be conceived.

When a spherical antenna array generated using a regular polyhedron and geodesic partitioning of the regular polyhedron is used, sectors can be formed using duality of the regular polyhedron. Here, a sector is a partial space obtained by partitioning a whole space in which an antenna array transmits signals.

Duality Related to Formation of Sectors Will be Described with Reference to FIG. 22

Referring to FIG. 22, a regular icosahedron circumscribed about a regular dodecahedron is present ((a) of FIG. 22) and a regular dodecahedron circumscribed about a regular icosahedron is present ((b) of FIG. 22). This is called duality of polyhedrons.

When the aforementioned property is used, sectors that are faces of the circumscribed regular dodecahedron which occupy the whole space are formed in the case of a spherical array in which antenna elements are disposed at vertexes of the regular icosahedron. Examples of such sectors are illustrated in FIG. 23.

(a) of FIG. 23 illustrates sectors with respect to a regular icosahedral vertex antenna array and (b) of FIG. 23 illustrates sectors with respect to a regular icosahedral geodesic 3-partition vertex antenna array. In this case, a sector in the three-dimensional space is a space in a regular pentagonal pyramid.

In the case of a geodesic array based on a regular icosahedron, the same sector partitioning can also be used. Further, in the case of an antenna array using a regular dodecahedron and geodesic partitioning based on the regular dodecahedron, faces of a circumscribed regular icosahedron define sectors and each sector in the three-dimensional space has a regular triangular pyramid.

Hereinafter, a beamforming method in the aforementioned sector will be described in detail.

A beamforming vector in the sector is selected using the following process. An LCS obtained by inserting antenna coordinate information $(\theta_m, \phi_m)$ positioned at the center of the sector into Equation 18 is used as reference coordinates in the sector.

A boresight beam of a sector center antenna passes through the center of the cross section of the sector and corresponds to a direction indicated by an arrow in FIG. 23. A beamforming vector is generated using Equation 17 for user position information $(\Theta, \Phi)$. When each element in an antenna array transmits a signal using the generated beamforming vector v, a received signal y is represented by the following Equation 19.

$$y = hvs + w \quad \text{[Equation 19]}$$

Here, h is a channel vector, s is a transmitted data symbol, and w is an interference and noise component.

Hereinafter, a codebook generation method using the aforementioned beamforming method will be described in detail.

Specifically, a codebook used in a sector refers to a set of a plurality of beamforming vectors previously selected in consideration of various user positions present in the sector. Here, each beamforming vector included in the codebook is referred to as a codevector. However, the aforementioned term is merely for convenience of description and does not limit the scope of the present disclosure.

A user transmits information on selection of a codevector to be used during transmission through feedback after channel estimation.

When B-bit feedback is transmitted, the codebook includes $Q=2^B$ codevectors.

Examples of a codevector selection method according to variation in the number of feedback bits when a spherical array based on a regular icosahedron is used are illustrated in FIG. 24. In FIG. 24, positions indicated by points refer to beam directions of codevectors. For B=2, 3, 4, the codebook includes Q=4, 8, 16 codevectors. In addition, codevectors disposed on concentric circles represented by dotted lines in FIG. 24 are positioned an equal distance from the center of the cross section of a sector. The codebook C defined in this manner can be represented by the following Equation 20.

$$C = \{v_1, v_2, \ldots, v_Q\} \quad \text{[Equation 20]}$$

The codebook C is represented by a set of Q codevectors as above. A q-th codevector in the set is represented by the following Equation 21.

$$v_q = [v_{q,0} v_{q,1} \ldots v_{q,M-1}]^T \quad \text{[Equation 21]}$$

The q-th codevector $v_q$ in the codebook C is a vector having a length of M.

As in the aforementioned Equation 17, the m-th element $v_{q,m}$ of the codevector $v_q$ is for phase correction of the m-th antenna element included in the antenna array and is represented by the following Equation 22.

$$v_{q,m} = e^{j2\pi \frac{r}{\lambda}(\sin\Theta_q \sin\theta_m \cos(\Phi_q - \phi_m) + \cos\Theta_q \cos\theta_m)} \quad \text{[Equation 22]}$$

In Equation 22, r represents the radius of the spherical array which is the distance between the origin and the antenna element. q=0, 1, ..., Q is a codevector index and m=0, 1, ..., M−1 is an antenna element index. In the case of an antenna array disposed at the vertexes of a regular icosahedron, positions of antenna elements are illustrated in FIG. 25. Coordinates of each antenna is shown in the following Table 3.

TABLE 3

| | $\theta_m$ | $\phi_m$ |
|---|---|---|
| $A_0$ | 0 | 0 |
| $A_1$ | α | π/5 |
| $A_2$ | α | 3π/5 |
| $A_3$ | α | 5π/5 |
| $A_4$ | α | 7π/5 |
| $A_5$ | α | 9π/5 |
| $A_6$ | π − α | 2π/5 |
| $A_7$ | π − α | 4π/5 |
| $A_8$ | π − α | 6π/5 |
| $A_9$ | π − α | 8π/5 |
| $A_{10}$ | π − α | 10π/5 |
| $A_{11}$ | π | π |

In Table 3, α is $$2\tan^{-1}\frac{2}{1+\sqrt{5}} = 63.4°.$$

In the case of a codevector position for each number of feedback bits illustrated in FIG. 24, an optimal position can be selected through search, and the following Table 4 shows examples of codevector coordinates $(\Theta_q, \Phi_q)$ corresponding to the optimal position.

TABLE 4

| Codevector index q | B = 1 | | B = 2 | | B = 3 | | B = 4 | |
|---|---|---|---|---|---|---|---|---|
| | $\theta_q$ | $\phi_q$ | $\theta_q$ | $\phi_q$ | $\theta_q$ | $\phi_q$ | $\theta_q$ | $\phi_q$ |
| 1 | 12.0 | 0.0 | 0.0 | 0.0 | 0.0 | 0.0 | 0.0 | 0.0 |
| 2 | 12.0 | 180.0 | 22.0 | 0.0 | 24.5 | 0.0 | 13.5 | 0 |
| 3 | | | 22.0 | 120.0 | 24.5 | 51.4 | 13.5 | 72.0 |
| 4 | | | 22.0 | 240.0 | 24.5 | 102.9 | 13.5 | 144.0 |
| 5 | | | | | 24.5 | 154.3 | 13.5 | 216.0 |
| 6 | | | | | 24.5 | 205.7 | 13.5 | 288.0 |
| 7 | | | | | 24.5 | 257.1 | 28.0 | 30.0 |
| 8 | | | | | 24.5 | 308.6 | 28.0 | 108.0 |
| 9 | | | | | | | 28.0 | 180.0 |
| 10 | | | | | | | 28.0 | 252.0 |
| 11 | | | | | | | 28.0 | 324.0 |
| 12 | | | | | | | 30.0 | 0 |
| 13 | | | | | | | 30.0 | 72.0 |
| 14 | | | | | | | 30.0 | 144.0 |
| 15 | | | | | | | 30.0 | 216.0 |
| 16 | | | | | | | 30.0 | 288.0 |

As described above, the present disclosure proposes a codevector set that can be generated in a specific reference region such as "sector". This codebook can be transformed/modified/substituted into/to/with another region such as another "sector" and applied, which will be described in detail later. Here, the codevector set that can be generated in the specific reference region may be defined/set in advance as shown in Table 4, and a specific codevector generation function may be defined/set/indicated and applied.

In addition, a main codevector generation parameter mentioned in the present disclosure may be semi-statically and/or dynamically set/changed/indicated. For example, after the codevector generation parameter is set in a UE through a higher layer signal such as RRC/MAC, conversion of a previously generated codebook (codevector set) may be indicated through downlink control information (DCI). As another example, a UE may be instructed to generate or apply a codebook (codevector set) having a different number of bits through downlink control information (DCI).

Hereinafter, a method of operating the aforementioned codebook will be described in detail.

The codebook may be applied to all users or a specific user group in a sector, and the size of the codebook may be changed in response to required beamforming accuracy. Further, only some codevectors of the proposed codebook may be used based on channel and geographical environment information of a UE.

That is, it is possible to optionally use the codebook in an optimized form in a given environment by changing or updating the codebook through higher layer signaling. For a selected codebook, a user selects an optimal codevector index such that a target performance index such as correlation with a channel is maximized and feeds back the optimal codevector index to a transmitting device, and thus transmission beamforming can be performed.

Hereinafter, a method for using a codebook in a sector for all sectors will be described in detail.

To apply a codebook defined for a user in a single sector to all sectors, the following conversion method may be used.

Specifically, sectors are defined based on antenna elements positioned at the centers of respective sectors, and a local coordinate system used in the m-th sector in which the m-th antenna element $A_m$ is positioned at the center thereof is referred to as an LCSm. Relative positional relations of antenna elements changes according to the reference LCS. Relative positional relations of antenna elements $A_0$ to $A_{11}$ according to the LCS are illustrated in FIGS. 26 and 27.

FIGS. 26 and 27 illustrate relative positions with respect to a regular icosahedral vertex antenna array. A local coordinate system in which the antenna element $A_m$ is positioned at the center is denoted by LCSm and antenna elements other than the center antenna element are rearranged in changed orders.

Accordingly, a codebook in a sector generated according to the above-described embodiment may be used for a 0-th sector based on LCS0. For the remaining sectors, codevector elements may be rearranged to be suitable for antenna element arrangement forms stored for the corresponding LCSs. When a codevector used in LCS0 corresponding to the reference sector is represented by $v=[v_0\ v_1\ \ldots\ v_{M-1}]^T$, a codevector $v^{(m)}$ used in LCSm is represented by the following Equation 23.

$$v^{(m)}=[v_0^{(m)}v_1^{(m)}\ldots v_{M-1}^{(m)}]^T \quad \text{[Equation 23]}$$

The codevector $v^{(m)}$ can be obtained through permutation of elements of the codevector v. In the case of a regular icosahedral vertex antenna array, a codevector having elements in changed order for LCS1 can be represented by Equation 24.

$$v^{(1)}=[v_0^{(1)}v_1^{(1)}v_2^{(1)}v_3^{(1)}v_4^{(1)}v_5^{(1)}v_6^{(1)}v_7^{(1)}v_8^{(1)}v_9^{(1)}v_{10}^{(1)}v_{11}^{(1)}]^T==[v_3v_0v_2v_7v_8v_4v_6v_{11}v_9v_5v_{10}]^T \quad \text{[Equation 24]}$$

Specifically, referring to Equation 24 and Equation 26, to use the codebook for LCS0 as a codebook for LCS1, codevectors of the codebook LCS0 are arranged in LCS1 based on antenna positions in LCS0.

A codevector $v_3$ for an antenna element $A_3$ in LCS0 corresponds to an antenna element $A_0$ in LCS1, and thus is positioned at the head (#0). A codevector $v_5$ for an antenna element $A_5$ in LCS0 corresponds to an antenna element $A_{10}$ in LCS1, and thus is positioned second to the last (#10). A codevector $v_2$ for an antenna element $A_2$ in LCS0 corresponds to the same antenna element $A_2$ in LCS1, and thus the position thereof is not changed.

In this manner, a codebook for a sector can be transformed into a codebook for another sector. Examples of codevector orders for LCSs may be arranged as shown in Table 5.

TABLE 5

| | $v_0^{(m)}$ | $v_1^{(m)}$ | $v_2^{(m)}$ | $v_3^{(m)}$ | $v_4^{(m)}$ | $v_5^{(m)}$ | $v_6^{(m)}$ | $v_7^{(m)}$ | $v_8^{(m)}$ | $v_9^{(m)}$ | $v_{10}^{(m)}$ | $v_{11}^{(m)}$ |
|---|---|---|---|---|---|---|---|---|---|---|---|---|
| LCS 0 | $v_0$ | $v_1$ | $v_2$ | $v_3$ | $v_4$ | $v_5$ | $v_6$ | $v_7$ | $v_8$ | $v_9$ | $v_{10}$ | $v_{11}$ |
| LCS 1 | $v_3$ | $v_0$ | $v_2$ | $v_7$ | $v_8$ | $v_4$ | $v_1$ | $v_6$ | $v_{11}$ | $v_9$ | $v_5$ | $v_{10}$ |
| LCS 2 | $v_3$ | $v_4$ | $v_0$ | $v_2$ | $v_7$ | $v_8$ | $v_5$ | $v_1$ | $v_6$ | $v_{11}$ | $v_9$ | $v_{10}$ |
| LCS 3 | $v_3$ | $v_8$ | $v_4$ | $v_0$ | $v_2$ | $v_7$ | $v_9$ | $v_5$ | $v_1$ | $v_6$ | $v_{11}$ | $v_{10}$ |
| LCS 4 | $v_3$ | $v_7$ | $v_8$ | $v_4$ | $v_0$ | $v_2$ | $v_{11}$ | $v_9$ | $v_5$ | $v_1$ | $v_6$ | $v_{10}$ |
| LCS 5 | $v_3$ | $v_2$ | $v_7$ | $v_8$ | $v_4$ | $v_0$ | $v_6$ | $v_{11}$ | $v_9$ | $v_5$ | $v_1$ | $v_{10}$ |
| LCS 6 | $v_{10}$ | $v_1$ | $v_5$ | $v_9$ | $v_{11}$ | $v_6$ | $v_0$ | $v_4$ | $v_8$ | $v_7$ | $v_2$ | $v_3$ |
| LCS 7 | $v_{10}$ | $v_6$ | $v_1$ | $v_5$ | $v_9$ | $v_{11}$ | $v_2$ | $v_0$ | $v_4$ | $v_8$ | $v_7$ | $v_3$ |
| LCS 8 | $v_{10}$ | $v_{11}$ | $v_6$ | $v_1$ | $v_5$ | $v_9$ | $v_7$ | $v_2$ | $v_0$ | $v_4$ | $v_8$ | $v_3$ |
| LCS 9 | $v_{10}$ | $v_9$ | $v_{11}$ | $v_6$ | $v_1$ | $v_5$ | $v_8$ | $v_7$ | $v_2$ | $v_0$ | $v_4$ | $v_3$ |
| LCS 10 | $v_{10}$ | $v_5$ | $v_9$ | $v_{11}$ | $v_6$ | $v_1$ | $v_5$ | $v_8$ | $v_7$ | $v_2$ | $v_0$ | $v_3$ |
| LCS 11 | $v_{11}$ | $v_7$ | $v_6$ | $v_{10}$ | $v_9$ | $v_8$ | $v_2$ | $v_1$ | $v_5$ | $v_4$ | $v_3$ | $v_0$ |

The aforementioned operation of transforming/substituting/applying a codebook generated in a specific reference region such as a specific "sector" into/with/to another region may be applied in association with the following operation.

Specifically, an operation of differently setting/indicating/changing an antenna port number of a specific reference signal (e.g., CSI-RS) set/transmitted by an eNB for application of a specific codebook in response to a specific region such as a sector to which a UE belongs, resources of a specific reference signal (beam-managed/controlled/indicated RS), or an index may be associated with the aforementioned codebook conversion operation.

For application of the antenna port number or codebook, corresponding specific preferred port numbering (i.e., information on permutation or an order in which CSI-RS porting numbering will be performed, or the like) may be reported at the time of UE capability reporting, or a predetermined value and/or a value set/indicated by an eNB may be used. Otherwise, the aforementioned information may be defined/set/indicated such that a UE reports it long-term.

Operations of a UE/eNB according to the above-described embodiments may be processed by one or more processors 102 and 202 shown in FIGS. 40 to 45. In addition, operations according to the above-described embodiments may be stored in a memory (e.g., one or more memories 104 and 203 in FIG. 1) in the form of commands/programs (e.g., instruction and executable code) for driving one or more processors (e.g., 102 and 202).

Hereinafter, matters with respect to the above-described application examples and performance of the present disclosure will be described in detail with reference to FIGS. 28 to 34.

Antenna array and beamforming characteristics according to the above-described embodiments are as follows. An array having antennas positioned at the vertexes of a regular icosahedron has a shape as illustrated in FIG. 25, and a minimum distance between neighboring elements is set to a half wavelength or another value for M=12 elements. When the minimum distance between neighboring elements set to a half wavelength fora carrier frequency of 2 GHz, the minimum distance is 7.5 cm, and the radius of a sphere that is a distance from the origin to antenna elements is 7.13 cm. Spherical coordinate values of the antenna elements are as shown in Table 2. A beamformer generated in a direction of Θ=0° and ɸ=0° by applying Equation 17 to this spherical antenna array may be represented by Equation 25.

$$v = \begin{bmatrix} v_0 \\ v_1 \\ v_2 \\ v_3 \\ v_4 \\ v_5 \\ v_6 \\ v_7 \\ v_8 \\ v_9 \\ v_{10} \\ v_{11} \end{bmatrix} = \begin{bmatrix} e^{j\beta\pi(\sin 0 \sin 0 \cos(0-0)+\cos 0 \cos 0)} \\ e^{j\beta\pi(\sin 0 \sin\alpha\cos(0-\frac{\pi}{5})+\cos 0 \cos\alpha)} \\ e^{j\beta\pi(\sin 0 \sin\alpha\cos(0-\frac{3\pi}{5})+\cos 0 \cos\alpha)} \\ e^{j\beta\pi(\sin 0 \sin\alpha\cos(0-\frac{5\pi}{5})+\cos 0 \cos\alpha)} \\ e^{j\beta\pi(\sin 0 \sin\alpha\cos(0-\frac{7\pi}{5})+\cos 0 \cos\alpha)} \\ e^{j\beta\pi(\sin 0 \sin\alpha\cos(0-\frac{9\pi}{5})+\cos 0 \cos\alpha)} \\ e^{j\beta\pi(\sin 0 \sin(\pi-\alpha)\cos(0-\frac{2\pi}{5})+\cos 0 \cos(\pi-\alpha))} \\ e^{j\beta\pi(\sin 0 \sin(\pi-\alpha)\cos(0-\frac{4\pi}{5})+\cos 0 \cos(\pi-\alpha))} \\ e^{j\beta\pi(\sin 0 \sin(\pi-\alpha)\cos(0-\frac{6\pi}{5})+\cos 0 \cos(\pi-\alpha))} \\ e^{j\beta\pi(\sin 0 \sin(\pi-\alpha)\cos(0-\frac{8\pi}{5})+\cos 0 \cos(\pi-\alpha))} \\ e^{j\beta\pi(\sin 0 \sin(\pi-\alpha)\cos(0-\frac{10\pi}{5})+\cos 0 \cos(\pi-\alpha))} \\ e^{j\beta\pi(\sin 0 \sin\pi\cos(0-0)+\cos 0 \cos\pi)} \end{bmatrix}$$

[Equation 25]

Here $$\alpha = 2\tan^{-1}\frac{2}{1+\sqrt{5}} = 63.43°$$

and β=0.95. When the beamformer generated in the direction of Θ=0° as described above is used, received beam power when a zenith angle Θ of an actual user position was observed while the zenith angle Θ is changed in a period of [−τr, +τr] is illustrated in FIG. 28.

Referring to (a) of FIG. 28, when a distance between antenna elements is set to a half wavelength, 3 dB beamwidth is 54° and IPP is −12.86 dB. Beamforming gain on the Y axis represents a relative magnitude of received power when a maximum value of a main beam is regularized to 0 dB.

Referring to (b) of FIG. 28, when the minimum distance between elements is set to 1 wave length for the same antenna array shape, 3 dB beamwidth is reduced to 27° but IPP considerably increases to −49 dB. This is not desirable in a multi-user environment because high IPP may affect signals of other users.

As an effective method for reducing 3 dB beamwidth without increasing IPP, an array using geodesic partitioning may be used.

An array having an increased number of antenna elements through regular icosahedron based geodesic partitioning was generated, a minimum distance between antennas positioned at vertexes was set to a half wavelength or 1 wave length, and then beam shapes were observed while a user position was changed with respect to a beamformer generated in direction of $\Theta=0°$ and $\phi=0°$. Beam shapes corresponding to 2-partition, 3-partition, and 4-partition geodesic arrays are respectively illustrated in FIG. 29, FIG. 30, and FIG. 31.

Variation in performance indexes according to increase in the number of partitions, confirmed through the illustrated beam shapes, is shown in the following Table 6.

TABLE 6

| Number of partitions n | 3 dB beamwidth | | Interference peak power | |
|---|---|---|---|---|
| | Half wavelength ($\kappa_n = 0.5$) | 1 wave length ($\kappa_n = 1$) | Half wavelength ($\kappa_n = 0.5$) | 1 wave length ($\kappa_n = 1$) |
| 1 | 54° | 27° | −12.65 dB | −4.89 dB |
| 2 | 27° | 14° | −12.86 dB | −8.53 dB |
| 3 | 17° | 9° | −13.02 dB | −7.85 dB |
| 4 | 13° | 6.5° | −13.13 dB | −10.55 dB |

Referring to Table 6, as the number of partitions increases, it is possible to reduce 3 dB beamwidth while maintaining IPP at similar levels to generate a highly concentrated beam. When the minimum distance between antennas is set to 1 wave length in each case, IPP increases.

Beam shapes obtained when the above-described beamformer generation method is applied to a spherical antenna array in which s×s subarrays are attached to vertexes of a regular icosahedron will be described with reference to FIG. 32 and FIG. 33.

A minimum distance $\epsilon$ between antenna elements in a subarray is set to a half wavelength ($\epsilon=\lambda/2$) and a distance $\delta$ between the centers of neighboring subarrays is set to s time or 2s times $\epsilon$ ($\delta/\epsilon=s$ or $\delta/\epsilon=2s$). A beamformer is generated in a direction of $\Theta=0°$ and $\Phi=0°$ as described above, and beamforming gains when a received signal observation position is changed in a period of $[-\tau r, +\tau r]$ are illustrated in FIG. 32 and FIG. 33.

FIG. 32 illustrates gain patterns when 2×2 subarrays are applied and FIG. 33 illustrates gain patterns when 3×3 subarrays are applied. 3 dB beamwidth and IPP observed in respective cases can be summarized as shown in the following Table 7.

TABLE 7

| Subarray size s × s | 3 dB beamwidth | | Interference peak power | |
|---|---|---|---|---|
| | $\delta/\epsilon = s$ | $\delta/\epsilon = 2s$ | $\delta/\epsilon = s$ | $\delta/\epsilon = 2s$ |
| 1 × 1 (s = 1) | 54° | 27° | −12.65 dB | −4.89 dB |
| 2 × 2 (s = 2) | 25° | 13° | −13.07 dB | −7.87 dB |
| 3 × 3 (s = 3) | 14.5° | 8.6° | −13.26 dB | −7.52 dB |

In Table 7, the item indicated by 1×1 (s=1) refers to a case in which a subarray is not applied, that is, a case in which one antenna element is disposed at each vertex of a regular icosahedron. It can be ascertained that 3 dB beamwidth is reduced to obtain a concentrated beam as the subarray size increases, and settings of $\delta/\epsilon=s$ are suitable in consideration of interference level.

Performance variation observed in response to change in the number of feedback bits after generation of the codebook in a sector as represented by Equation 19 to Equation 21 and application of the codebook to a regular icosahedral vertex antenna array will be described with reference to FIG. 34.

A user channel is generated at an arbitrary channel in a sector and then a correlation with a codevector closest to the corresponding channel is calculated, and an average of repeatedly generated user channels is shown in FIG. 34. In a codebook generated using coordinate values of Table 4, average correlation performance continuously increases as the number of bits increases and reaches 97% of a maximum correlation value.

In FIG. 34, greedy search provided as a comparative object refers to a method of selecting a codevector through sequential search. It can be ascertained that the performance of the codebook determined through Table 4 is superior to the performance of a codebook obtained through sequential search.

Hereinafter, differences between an antenna array according to an embodiment of the present disclosure and a conventional antenna array will be described in detail with reference to FIG. 35 and FIG. 36.

For comparison with the present disclosure, a uniform rectangular array (URA) covering a 3-sector cell is conceived. 64 antenna elements are used when 8×8 URAs are applied per sector. Here, a total of 192 antenna elements are necessary for the entire cell including three sectors.

The antenna array according to an embodiment of the present disclosure has a configuration in which one regular icosahedral geodesic 4-partition vertex antenna is disposed at the center of the cell and is composed of a total of 162 antenna elements.

Beam shapes when beamforming is performed in a front boresight are illustrated in FIG. 35. (a) of FIG. 35 illustrates beam shapes according to an embodiment of the present disclosure and (b) of FIG. 35 illustrates beam shapes according to the URA. Both the URA and the spherical array have 3 dB beamwidth of about 13° and they have similar IPP values.

Beam shapes when beamforming is performed in beam directions of 0°, 45°, and 90° with respect to the boresight are illustrated in FIG. 36. (a) of FIG. 36 illustrates beam shapes according to an embodiment of the present disclosure and (b) of FIG. 36 illustrates beam shapes according to the URA.

As a radiation pattern per antenna element, values defined in 3GPP standard document are applied and specific formulas are as shown in the following Table 8.

TABLE 8

| Parameter | Value [dB] |
|---|---|
| Vertical radiation pattern of single antenna | $A_{E,V}(\theta_v) = -\min\left\{12\left(\frac{\theta_v - 90°}{\theta_{3dB}}\right)^2, SLA_v\right\}$, $\theta_{3dB} = 65°, SLA_v = 30$ |
| Horizontal radiation pattern of single antenna | $A_{E,H}(\phi_h) = -\min\left\{12\left(\frac{\phi_h}{\phi_{3dB}}\right)^2, A_m\right\}$, $\phi_{3dB} = 65°, A_m = 30$ |
| Radiation pattern having combination of horizontal and vertical components | $A(\theta_v, \phi_h) = -\min\{-[A_{E,V}(\theta_v) + A_{E,H}(\phi_h)], A_m\}$ |

Referring to (b) of FIG. 36, in the case of the URA, a position having a maximum power value become inaccurate as the direction of a target beam deviates from the front boresight, and particularly, the maximum power value tends to considerably decrease and IPP tends to increase.

Referring to (a) of FIG. 36, in the case of the antenna array according to an embodiment of the present disclosure, uniform and stable beam shapes are obtained irrespective of the direction of a target beam. This can be considered to be advantages that can be intuitively expected in consideration of omnidirectional symmetry of a spherical array. In addition, the spherical array according to an embodiment of the present disclosure has an additional advantage of providing a uniform beam shape even for a distribution of vertical users such as high-rise buildings and aerial vehicles in addition to horizontal beam direction variation.

Hereinafter, effects of the above-described embodiments will be summarized in comparison to conventional methods.

Conventional sector partitioning and beamforming methods using a uniform linear antenna array or a uniform rectangular antenna array have limitations such as performance deterioration near a sector boundary and difficulty beamforming according to vertical height variation of a communication device. A mobile communication system transmitting device capable of overcoming such limitations is required.

The three-dimensional spherical antenna array shape, execution of beamforming for the shape, and a codebook generation method according to sector partitioning according to embodiments of the present disclosure overcome limitations of conventional technologies such that transmission having omnidirectional stable performance in a three-dimensional space can be performed.

In addition, the antenna array design method according to embodiments of the present disclosure allows various numbers of antenna elements to be used, and thus an array suitable for a target beamwidth and IPP can be selected.

As an example of the design method, a geodesic partitioning method based on a regular polyhedron based spherical array or a method of using additional subarrays has been proposed. The aforementioned array form allows omnidirectional stable beamforming since repeated regular arrangements are used on a three-dimensional space. Particularly, when high frequency bands such as millimeter-wave bands to be used in next-generation mobile communication are used, an array more reduced in size and having antenna elements densely disposed can perform accurate beamforming. Furthermore, various methods of using spherical antennas having forms similar to that of the proposed spherical antenna by varying the form of the overall antenna array through partial variation in subarrays may be provided.

Hereinafter, a method for reporting channel state information for performing antenna array based beamforming in a wireless communication system based on the above-described embodiments and a device therefor will be described in detail with reference to FIGS. 37 to 39.

FIG. 37 is a flowchart for describing a method for reporting channel state information (CSI), by a UE, to perform beamforming based on an antenna array in a wireless communication system according to an embodiment of the present disclosure.

Referring to FIG. 37, the method for reporting CSI, by a UE, to perform beamforming based on an antenna array in a wireless communication system according to an embodiment of the present disclosure may include a step S3710 of receiving channel state information reference signal (CSI-RS), a step S3720 of generating channel state information using the CSI-RS and a codebook generated in advance, and a step S3730 of reporting the channel state information.

According to an embodiment, the antenna array has a three-dimensional shape having omnidirectional symmetry. The omnidirectional symmetry means that a shape (e.g., a pentagon) when viewed in one direction is consistent with a shape when viewed in another direction (opposite direction) and this property is identical in any direction.

For example, in the case of a regular icosahedron, a shape when viewed in one direction is a pentagon and a shape when viewed in the opposite direction is also a pentagon. The regular icosahedron is viewed as a pentagonal shape in any direction, and thus has the omnidirectional symmetry.

As another example of a three-dimensional shape having the omnidirectional symmetry, a sphere or a regular dodecahedron may be conceived. However, a three-dimensional shape having the omnidirectional symmetry is not limited thereto and may include any three-dimensional shape viewed as the same shape (e.g., a circle, a pentagon, or a triangle) in any direction.

According to an embodiment, each of antennas included in the antenna array may be a constant distance from the center of the three-dimensional shape and may be arranged in an area on the surface of the three-dimensional shape such that each antenna is symmetrical to other antennas included in the antenna array.

In S3710, the UE (100/200 in FIGS. 40 to 45) receives the CSI-RS from a BS (100/200 in FIGS. 40 to 45).

The operation of the UE (100/200 in FIGS. 40 to 45) to receive the CSI-RS from a BS (100/200 in FIGS. 40 to 45) in S3710 may be implemented by devices in FIGS. 40 to 45.

For example, referring to FIG. 41, at least one processor 102 may control at least one transceiver 106 and/or at least one memory 104 such that they receive the CSI-RS from a BS.

In 3720, the UE (100/200 in FIGS. 40 to 45) generates the channel state information (CSI) using the CSI-RS and a codebook generated in advance.

According to an embodiment, the CSI may include information related to codevectors determined in the codebook. The codebook may be generated based on the position of the UE (100/200 in FIGS. 40 to 45) having the center of the three-dimensional shape as the origin. The position of the UE (100/200 in FIGS. 40 to 45) may be specified in a three-dimensional spherical coordinate system or a polar coordinate system. That is, the position of the UE (100/200 in FIGS. 40 to 45) may be represented based on the polar coordinate system.

According to an embodiment, a whole space in which the antenna array transmits RF signals may be partitioned into a plurality of sectors according to the three-dimensional shape. More specifically, the whole space may be partitioned into the plurality of sectors according to a shape circumscribed about the three-dimensional shape. For example, when the three-dimensional shape of the antenna array is a regular icosahedron, the circumscribed shape is a regular dodecahedron. A pentagonal pyramid corresponding to each face of the regular dodecahedron becomes each sector.

Here, the codebook may be generated for specific sectors from among the plurality of sectors and the position of the UE may belong to the specific sectors.

According to an embodiment, the codebook C is a set of a specific number Q of codevectors and may be represented by the following equation.

$$C=\{v_1, v_2, \ldots, v_Q\} \quad \text{[Equation]}$$

Here, v is a codevector and Q is $2^B$ wherein B is a predetermined number of bits.

According to an embodiment, a codevector $v_q$ included in the codebook may be represented by the following equation.

$$v_q = [v_{q,0} v_{q,1} \cdots v_{q,M-1}]^T \quad \text{[Equation]}$$

Here, q is a natural number, $1 \leq q \leq Q$, M is the number of antennas included in the antenna array, and T represents a transpose operation.

According to an embodiment, an element $v_{q,m}$ included in the codevector $v_q$ is a value for phase correction of each antenna included in the antenna array and may be represented by the following equation.

$$v_{q,m} = e^{j2\pi r/\lambda(\sin\Theta_q \sin\theta_m \cos(\Phi_q - \phi_m) + \cos\Theta_q \cos\theta_m)}$$ [Equation]

Here, m is an index of each antenna included in the antenna array, $0 \leq m \leq M-1$, r is a distance between the center of the three-dimensional shape and each antenna, $\lambda$ is a wavelength according to a carrier frequency at which the CSI-RS is transmitted, $\theta_m$ is a zenith angle at a position of each antenna, $\phi_m$ is an azimuth angle at the position of each antenna, $\Theta_q$ is a zenith angle at a position of the codevector $v_q$ in the specific sectors, and $\Phi_q$ is an azimuth angle at a position of the codevector $v_q$ in the specific sectors.

According to an embodiment, the UE (100/200 in FIGS. 40 to 45) may transform the codebook generated for the specific sectors into a codebook for another sector.

Specifically, the codebook may be transformed into a codebook for another sector included in the plurality of sectors.

Each sector included in the plurality of sectors may be defined based on a local coordinate system (LCS) related to relative positions between an antenna $A_m$ positioned at the center of the corresponding sector and other antennas. The LCS may be referred to as LCSm based on the antenna $A_m$ positioned at the center of the corresponding sector.

The aforementioned transformation may be performed in such a manner that the order of elements of each codevector included in the codebook is rearranged according to an LCS (e.g., LCSn) in the other sector.

The operation of the UE (100/200 in FIGS. 40 to 45) to generate the CSI using the CSI-RS and the codebook generated in advance in S3720 may be implemented by the devices in FIGS. 40 to 45.

For example, referring to FIG. 41, at least one processor 102 may control at least one transceiver 106 and/or at least one memory 104 in order to generate the CSI using the CSI-RS and the codebook generated in advance.

In S3730, the UE (100/200 in FIGS. 40 to 45) reports the CSI to the BS (100/200 in FIGS. 40 to 45). The operation of the UE (100/200 in FIGS. 40 to 45) to report the CSI to the BS (100/200 in FIGS. 40 to 45) in S3730 may be implemented by the devices in FIGS. 40 to 45.

For example, referring to FIG. 45, the UE 100 may be implemented as a manned/unmanned aerial vehicle (AV) or a drone. A control unit 120 may control a communication unit 110 and/or a memory unit 130 in order to report the CSI to the BS 200.

According to an embodiment UE (100/200 in FIGS. 40 to 45) may use a preset codebook, newly generate a codebook, or transform an existing codebook in order to generate the CSI.

Generation of the codebook will be described below with reference to FIG. 38.

FIG. 38 is a flowchart for describing generation of a codebook in the method for reporting CSI according to an embodiment of the present disclosure in detail.

Referring to FIG. 38, a method for generating a codebook by the UE (100/200 in FIGS. 40 to 45) according to an embodiment of the present disclosure may include an information receiving step S3810 for generating a codebook, and a codebook generation step S3820.

In S3810, the UE (100/200 in FIGS. 40 to 45) receives information for generating the codebook from the BS (100/200 in FIGS. 40 to 45).

According to an embodiment, the information for generating the codebook may include information related to at least one of a preset number B of bits and the specific sectors to which the position of the UE (100/200 in FIGS. 40 to 45) belongs.

According to an embodiment, the information related to the specific sectors may be information related to a sector according to a current position of the UE (100/200 in FIGS. 40 to 45). For example, the information related to the specific sectors may be information on an antenna element positioned at the center of the current sector from among the antennas included in the antenna array. As another example, the information related to the specific sectors may be the index of the LCS according to the current sector.

The operation of the UE (100/200 in FIGS. 40 to 45) to receive the information for generating the codebook from the BS (100/200 in FIGS. 40 to 45) in S3810 may be implemented by the devices in FIGS. 40 to 45.

For example, referring to FIG. 41, at least one processor 102 may control at least one transceiver 106 and/or at least one memory 104 in order to receive the information for generating the codebook from the BS (100/200 in FIGS. 40 to 45).

In S3820, the UE (100/200 in FIGS. 40 to 45) generates the codebook.

Specifically, the UE generates the codebook using the information for generating the codebook.

According to an embodiment, the information for generating the codebook may be downlink control information (DCI).

According to an embodiment, the DCI may be transmitted according to change in the position of the UE (100/200 in FIGS. 40 to 45) in order to dynamically apply the codebook. Specifically, the DCI may be retransmitted when the specific sectors change to other sectors included in the plurality of sectors due to change in the position of the UE (100/200 in FIGS. 40 to 45). Here, the DCI may further include information indicating regeneration of the codebook or transformation of the codebook into a codebook for another sector.

When the DCI indicates transformation of the codebook, the UE (100/200 in FIGS. 40 to 45) may transform the codebook by rearranging the order of elements of each codevector included in the codebook according to an LCS in the other sector.

The operation of the UE (100/200 in FIGS. 40 to 45) to generate the codebook in S3820 may be implemented by the devices in FIGS. 40 to 45.

For example, referring to FIG. 45, the UE 100 may be implemented by a manned/unmanned aerial vehicle (AV) or a drone. The control unit 120 may control the communication unit 110 and/or the memory unit 130 in order to generate the codebook.

Setting/generation/modification of the codebook may be semi-statically performed by a higher layer (RRC/MAC) signal or dynamically performed by the DCI. Further, the codebook may be dynamically modified by the DCI after being set through RRC signaling.

Accordingly, S3810 and S3820 may be performed prior to the step S3710 of receiving the CSI-RS or performed after the step S3730 of reporting the CSI. Further, S3810 and S3820 may be performed prior to S3710 and then performed again after S3730.

Hereinafter, the above-described methods will be described in detail with respect to operations of a BS with reference to FIG. 39.

FIG. 39 is a flowchart for describing a method for receiving channel state information (CSI), by a BS, to perform beamforming based on an antenna array in a wireless communication system according to an embodiment of the present disclosure.

Referring to FIG. 39, the method for receiving CSI, by the BS, to perform beamforming based on an antenna array in a wireless communication system according to an embodiment of the present disclosure may include a step S3910 of transmitting channel state information reference signal (CSI-RS) and a step S3920 of receiving channel state information (CSI) generated using the CSI-RS and a codebook generated in advance.

According to an embodiment, the antenna array has a three-dimensional shape having omnidirectional symmetry. The omnidirectional symmetry means that a shape (e.g., a pentagon) when viewed in one direction is consistent with a shape when viewed in another direction (opposite direction) and this property is identical in any direction.

For example, in the case of a regular icosahedron, a shape when viewed in one direction is a pentagon and a shape when viewed in the opposite direction is also a pentagon. The regular icosahedron is viewed as a pentagonal shape in any direction, and thus has the omnidirectional symmetry.

As another example of a three-dimensional shape having the omnidirectional symmetry, a sphere or a regular dodecahedron may be conceived. However, a three-dimensional shape having the omnidirectional symmetry is not limited thereto and may include any three-dimensional shape viewed as the same shape (e.g., a circle, a pentagon, or a triangle) in any direction.

According to an embodiment, each of antennas included in the antenna array may be a constant distance from the center of the three-dimensional shape and may be arranged in an area on the surface of the three-dimensional shape such that each antenna is symmetrical to other antennas included in the antenna array.

In S3910, the BS (100/200 in FIGS. 40 to 45) transmits the CSI-RS to a UE (100/200 in FIGS. 40 to 45).

The operation of the BS (100/200 in FIGS. 40 to 45) to transmit the CSI-RS to the UE (100/200 in FIGS. 40 to 45) in S3910 may be implemented by devices in FIGS. 40 to 45.

For example, referring to FIG. 41, at least one processor 202 may control at least one transceiver 206 and/or at least one memory 204 such that they transmit the CSI-RS to the UE 100.

In 3920, the BS (100/200 in FIGS. 40 to 45) receives the channel state information (CSI) from the UE (100/200 in FIGS. 40 to 45). Specifically, the CSI may be generated using the CSI-RS and a codebook generated in advance.

According to an embodiment, the CSI may include information related to codevectors determined in the codebook. The codebook may be generated based on the position of the UE (100/200 in FIGS. 40 to 45) having the center of the three-dimensional shape as the origin. The position of the UE (100/200 in FIGS. 40 to 45) may be specified in a three-dimensional spherical coordinate system or a polar coordinate system. That is, the position of the UE (100/200 in FIGS. 40 to 45) may be represented based on the polar coordinate system.

According to an embodiment, a whole space in which the antenna array transmits RF signals may be partitioned into a plurality of sectors according to the three-dimensional shape. More specifically, the whole space may be partitioned into the plurality of sectors according to a shape circumscribed about the three-dimensional shape. For example, when the three-dimensional shape of the antenna array is a regular icosahedron, the circumscribed shape is a regular dodecahedron. A pentagonal pyramid corresponding to each face of the regular dodecahedron becomes each sector.

Here, the codebook may be generated for specific sectors from among the plurality of sectors and the position of the UE may belong to the specific sectors.

According to an embodiment, the codebook C is a set of a specific number Q of codevectors and may be represented by the following equation.

$$C=\{v_1, v_2, \ldots, v_Q\}$$ [Equation]

Here, v is a codevector and Q is $2^B$ wherein B is a predetermined number of bits.

According to an embodiment, a codevector $v_q$ included in the codebook may be represented by the following equation.

$$v_q = [v_{q,0} v_{q,1} \ldots v_{q,M-1}]^T$$ [Equation]

Here, q is a natural number, $1 \leq q \leq Q$, M is the number of antennas included in the antenna array, and T represents a transpose operation.

According to an embodiment, an element $v_{q,m}$ included in the codevector $v_q$ is a value for phase correction of each antenna included in the antenna array and may be represented by the following equation.

$$v_{q,m} = e^{j2\pi r/\lambda(\sin\Theta_q \sin\theta_m \cos(\Phi_q - \phi_m) + \cos\Theta_q \cos\theta_m)}$$ [Equation]

Here, m is an index of each antenna included in the antenna array, $0 \leq m \leq M-1$, r is a distance between the center of the three-dimensional shape and each antenna, $\lambda$ is a wavelength according to a carrier frequency at which the CSI-RS is transmitted, $\theta_m$ is a zenith angle at a position of each antenna, $\phi_m$ is an azimuth angle at the position of each antenna, $\Theta_q$ is a zenith angle at a position of the codevector $v_q$ in the specific sectors, and $\Phi_q$ is an azimuth angle at a position of the codevector $v_q$ in the specific sectors.

According to an embodiment, the BS may instruct the UE to transform the codebook into a codebook for another sector.

Specifically, the codebook may be transformed into a codebook for another sector included in the plurality of sectors.

Each sector included in the plurality of sectors may be defined based on a local coordinate system (LCS) related to relative positions between an antenna $A_m$ positioned at the center of the corresponding sector and other antennas. The LCS may be referred to as LCSm based on the antenna $A_m$ positioned at the center of the corresponding sector.

The aforementioned transformation may be performed in such a manner that the order of elements of each codevector included in the codebook is rearranged according to an LCS (e.g., LCSn) in the other sector.

According to an embodiment, the BS (100/200 in FIGS. 40 to 45) may instruct the UE (100/200 in FIGS. 40 to 45) to semi-statically set the codebook for generating the CSI or to dynamically generate/transform the set codebook.

Specifically, the BS (100/200 in FIGS. 40 to 45) may transmit information for generating the codebook to the UE (100/200 in FIGS. 40 to 45).

According to an embodiment, the information for generating the codebook may include information related to at least one of a preset number B of bits and the specific sectors to which the position of the UE (100/200 in FIGS. 40 to 45) belongs.

According to an embodiment, the information related to the specific sectors may be information related to a sector according to a current position of the UE (100/200 in FIGS. 40 to 45). For example, the information related to the specific sectors may be information on an antenna element positioned at the center of the current sector from among the antennas included in the antenna array. As another example, the information related to the specific sectors may be the index of the LCS according to the current sector.

The operation of the BS (100/200 in FIGS. 40 to 45) to transmit the information for generating the codebook to the UE (100/200 in FIGS. 40 to 45) may be implemented by the devices in FIGS. 40 to 45.

For example, referring to FIG. 41, at least one processor 202 may control at least one transceiver 206 and/or at least one memory 204 in order to transmit the information for generating the codebook to the UE 100.

As another example, referring to FIG. 45, the BS 200 may perform communication with the UE 100 implemented by a manned/unmanned aerial vehicle (AV) or a drone. The control unit 220 may control the communication unit 210 and/or the memory unit 230 in order to transmit the information for generating the codebook to the drone 100.

According to an embodiment, the information for generating the codebook may be downlink control information (DCI).

According to an embodiment, the BS (100/200 in FIGS. 40 to 45) may transmit the DCI according to change in the position of the UE (100/200 in FIGS. 40 to 45) in order to dynamically apply the codebook.

Specifically, the BS (100/200 in FIGS. 40 to 45) may retransmit the DCI when the specific sectors change to other sectors included in the plurality of sectors due to change in the position of the UE (100/200 in FIGS. 40 to 45). Here, the DCI may further include information indicating regeneration of the codebook or transformation of the codebook into a codebook for another sector.

When the DCI indicates transformation of the codebook, the UE (100/200 in FIGS. 40 to 45) transforms the codebook by rearranging the order of elements of each codevector included in the codebook according to an LCS in the other sector.

Example of wireless communication system applied to the present disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 40 illustrates a communication system 1 applied to the present disclosure.

Referring to FIG. 40, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of wireless device applied to the present disclosure.

FIG. 41 illustrates wireless devices applicable to the present disclosure.

Referring to FIG. 41, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 40.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of signal processing circuit applied to the present disclosure

FIG. 42 illustrates a signal process circuit for a transmission signal.

Referring to FIG. 42, a signal processing circuit 1000 may include scramblers 1010, modulators 1020, a layer mapper 1030, a precoder 1040, resource mappers 1050, and signal generators 1060. An operation/function of FIG. 42 may be performed, without being limited to, the processors 102 and 202 and/or the transceivers 106 and 206 of FIG. 41. Hardware elements of FIG. 42 may be implemented by the processors 102 and 202 and/or the transceivers 106 and 206 of FIG. 41. For example, blocks 1010 to 1060 may be implemented by the processors 102 and 202 of FIG. 41. Alternatively, the blocks 1010 to 1050 may be implemented by the processors 102 and 202 of FIG. 41 and the block 1060 may be implemented by the transceivers 106 and 206 of FIG. 41.

Codewords may be converted into radio signals via the signal processing circuit 1000 of FIG. 42. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 42. For example, the wireless devices (e.g., 100 and 200 of FIG. 41) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 43 illustrates another example of a wireless device applied to the present disclosure.

The wireless device may be implemented in various forms according to a use-case/service (refer to FIG. 40). Referring to FIG. 43, wireless devices 100 and 200 may correspond to the wireless devices 100 and 200 of FIG. 41 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 41. For example, the transceiver(s) 114 may include the one or more transceivers 106 and 206 and/or the one or more antennas 108 and 208 of FIG. 41. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 40), the vehicles (100*b*-1 and 100*b*-2 of FIG. 40), the XR device (100*c* of FIG. 40), the hand-held device (100*d* of FIG. 40), the home appliance (100*e* of FIG. 40), the IoT device (100*f* of FIG. 40), a digital broadcast terminal, a hologram device, a public safety device, an MTC device, a medicine device, a fintech device (or a finance device), a security device, a climate/environment device, the AI server/device (400 of FIG. 40), the BSs (200 of FIG. 40), a network node, etc. The wireless device may be used in a mobile or fixed place according to a use-example/service.

In FIG. 43, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 44 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (VVT).

Referring to FIG. 44, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 43, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Example of Vehicle or Autonomous Driving Vehicle Applied to the Present Disclosure FIG. 45 illustrates a vehicle or an autonomous driving vehicle applied to the present disclosure.

The vehicle or autonomous driving vehicle may be implemented by a mobile robot, a car, a train, a manned/unmanned Aerial Vehicle (AV), a ship, etc.

Referring to FIG. 45, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information on a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Effects of the method for reporting channel state information for performing antenna array based beamforming in a wireless communication system and a device therefor according to an embodiment of the present disclosure are described below.

According to an embodiment of the present disclosure, channel state information is generated using a codebook generated in advance. The codebook is generated based on a position of a UE in accordance with a three-dimensional shape of an antenna array. The three-dimensional shape has omnidirectional symmetry, and the position of the UE is specified in polar coordinates having the center of the three-dimensional shape as the origin. The present disclosure performs feedback of the channel state information and thus stable beamforming can be performed omnidirectionally in the three-dimensional space.

In addition, in the present disclosure, the codebook is generated for specific sectors to which the position of the UE belongs from among a plurality of sectors partitioned according to the three-dimensional shape, and thus overhead for feedback of the channel state information can be reduced.

Furthermore, the present disclosure receives information for codebook generation and generates the codebook, and the information for codebook generation includes a predetermined number of bits or at least one of the specific sectors. The present disclosure can generate the codebook by changing the number of bits or sectors, and thus beamforming can be performed adaptively to a communication environment.

Furthermore, in the present disclosure, the information for codebook generation is retransmitted upon change of the position of the UE and further includes information indicating transformation of the codebook into a codebook for other sectors. Transformation of the codebook is performed by rearranging the order of elements of each codevector included in the codebook using a local coordinate system (LCS) with respect to relative positions between an antenna positioned at the center of the sectors and the remaining antennas. Accordingly, beamforming can be performed rapidly and stably using a transformed codebook even in a communication environment suffering a wide range of incident angle variation, such as a drone.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for reporting channel state information (CSI) by user equipment (UE) for beamforming based on an antenna array in a wireless communication system, the method comprising:

receiving a channel state information reference signal (CSI-RS);

generating channel state information using the CSI-RS and a codebook generated in advance; and reporting the channel state information, wherein the channel state information includes information related to a codevector determined in the codebook,
the antenna array has a three-dimensional shape having omnidirectional symmetry,
the codebook is generated based on a position of the UE having a center of the three-dimensional shape as an origin, and
the position of the UE is represented based on a polar coordinate system.

2. The method of claim 1, wherein each of antennas included in the antenna array is a constant distance from the center of the three-dimensional shape and is arranged in one area of the surface of the three-dimensional shape such that each antenna is symmetrical to other antennas included in the antennas.

3. The method of claim 2, wherein a whole space to which the antenna array transmits RF signals is partitioned into a plurality of sectors according to the three-dimensional shape,
the codebook is generated for specific sectors among the plurality of sectors, and
the position of the UE belongs to the specific sectors.

4. The method of claim 3, wherein the codebook C is a set of a specific number Q of codevectors and is represented by the following equation, $$C=\{v_1,v_2,\ldots,v_Q\} \quad \text{[Equation]}$$

wherein v is a codevector and Q is $2^B$, B being a preset number of bits.

5. The method of claim 4, wherein a codevector $v_q$ included in the codebook is represented by the following equation, $$v_q=[v_{q,0}v_{q,1}\ldots v_{q,M-1}]^T \quad \text{[Equation]}$$

wherein q is a natural number, $1 \leq q \leq Q$, M is a total number of antennas included in the antenna array, and T represents a transpose operation.

6. The method of claim 5, wherein an element $v_{q,m}$ included in the codevector $v_q$ is a value for phase correction of each antenna included in the antenna array and is represented by the following equation,

[Equation]

$$v_{q,m} = e^{j2\pi \frac{r}{\lambda}(sin\Theta_q sin\theta_m cos(\Phi_q-\phi_m)+cos\Theta_q cos\theta_m)}$$

wherein m is an index of each antenna included in the antenna array, $0 \leq m \leq M-1$, r is a distance between the center of the three-dimensional shape and each antenna, $\lambda$ is a wavelength according to a carrier frequency at which the CSI-RS is transmitted, $\theta_m$ is a zenith angle at a position of each antenna, $\phi_m$ is an azimuth angle at the position of each antenna, $\Theta_q$ is a zenith angle at a position of the codevector $v_q$ in the specific sectors, and $\Phi_q$ is an azimuth angle at a position of the codevector $v_q$ in the specific sectors.

7. The method of claim 6, wherein each sector included in the plurality of sectors is defined based on a local coordinate system (LCS) related to relative positions between an antenna positioned at the center of the sector and other antennas,
the codebook is transformed into a codebook for another sector included in the plurality of sectors, and
the transformation is performed in such a manner that the order of elements of each codevector included in the codebook is rearranged according to an LCS in the other sector.

8. The method of claim 3, further comprising:
receiving information for generating the codebook; and
generating the codebook,
wherein the information for generating the codebook includes the preset number B of bits and information on at least one of the specific sectors.

9. The method of claim 8, wherein the information for generating the codebook is downlink control information (DCI).

10. The method of claim 9, wherein the DCI is transmitted when the specific sectors change to sectors included in the plurality of sectors due to change of the position of the UE and further includes information indicating regeneration of the codebook or transformation of the codebook into the codebook with respect to the other sector.

11. The method of claim 10, wherein each sector included in the plurality of sectors is defined based on an LCS related to relative positions between an antenna positioned at the center of the sector and other antennas, and
the transformation is performed in such a manner that the order of elements of each codevector included in the codebook is rearranged according to the LCS in the other sector.

12. A UE reporting channel state information (CSI) for beamforming based on an antenna array in a wireless communication system, comprising:
a transceiver configured to transmit/receive RF signals;
a memory; and
a processor connected to the transceiver and the memory,
wherein the processor is configured:
to receive a channel state information reference signal (CSI-RS);
to generate channel state information using the CSI-RS and a codebook generated in advance; and
to report the channel state information,
wherein the channel state information includes information related to a codevector determined in the codebook,
the antenna array has a three-dimensional shape having omnidirectional symmetry,
the codebook is generated based on a position of the UE having the center of the three-dimensional shape as an origin, and
the position of the UE is represented based on a polar coordinate system.

13. A drone reporting channel state information (CSI) for beamforming based on an antenna array in a wireless communication system, comprising:
a transceiver configured to transmit/receive RF signals;
a memory; and
a processor connected to the transceiver and the memory,
wherein the processor is configured:
to receive a channel state information reference signal (CSI-RS);
to generate channel state information using the CSI-RS and a codebook generated in advance; and
to report the channel state information,
wherein the channel state information includes information related to a codevector determined in the codebook,
the antenna array has a three-dimensional shape having omnidirectional symmetry, the codebook is generated based on a position of the drone having the center of the three-dimensional shape as an origin, and the position of the drone is represented based on a polar coordinate system.

14. The drone of claim 13, wherein each of antennas included in the antenna array is a constant distance from the center of the three-dimensional shape and is arranged in one area of the surface of the three-dimensional shape such that each antenna is symmetrical to other antennas included in the antennas.

15. The drone of claim 14, wherein a whole space to which the antenna array transmits RF signals is partitioned into a plurality of sectors according to the three-dimensional shape, the codebook is generated by specific sectors among the plurality of sectors, and the position of the drone belongs to the specific sectors.

* * * * *